US008682709B2

(12) United States Patent
Coldren et al.

(10) Patent No.: US 8,682,709 B2
(45) Date of Patent: Mar. 25, 2014

(54) SYSTEM AND METHOD FOR MODELING CONSUMER CHOICE BEHAVIOR

(76) Inventors: Gregory M. Coldren, Rockville, MD (US); Frank S. Koppelman, Evanston, IL (US)

(*) Notice: Subject to any disclaimer, the term of this patent is extended or adjusted under 35 U.S.C. 154(b) by 1272 days.

(21) Appl. No.: 11/650,578

(22) Filed: Jan. 8, 2007

(65) Prior Publication Data

US 2007/0241944 A1 Oct. 18, 2007

Related U.S. Application Data

(60) Provisional application No. 60/756,566, filed on Jan. 6, 2006.

(51) Int. Cl.
*G06Q 10/00* (2012.01)
*G06Q 30/00* (2012.01)

(52) U.S. Cl.
USPC ........ 705/7.29; 705/7.11; 705/7.31; 705/7.37

(58) Field of Classification Search
USPC .................. 705/7.11, 7.25, 7.29, 7.31, 7.37
See application file for complete search history.

(56) References Cited

U.S. PATENT DOCUMENTS

| | | | | |
|---|---|---|---|---|
| 5,717,865 | A | * | 2/1998 | Stratmann ........................ 705/10 |
| 6,009,407 | A | * | 12/1999 | Garg .............................. 705/7.25 |
| 6,973,418 | B1 | * | 12/2005 | Kirshenbaum .................... 703/2 |
| 2002/0004739 | A1 | * | 1/2002 | Elmer et al. ..................... 705/10 |
| 2002/0065699 | A1 | * | 5/2002 | Talluri ............................... 705/8 |
| 2003/0177055 | A1 | * | 9/2003 | Zimmerman et al. ........... 705/10 |
| 2006/0104213 | A1 | * | 5/2006 | Sumner et al. ................ 370/252 |
| 2009/0132347 | A1 | * | 5/2009 | Anderson et al. ............... 705/10 |

OTHER PUBLICATIONS

Leszczyc, Peter; Bass, Frank M, "Determining the Effects of Observed and Unobserved Heterogeneity on Consumer Brand Choice", 1998, John Wiley & Sons, pp. 1-115.*
Small, Kenneth. Ordered Logit: A Discrete Choice Model with Proximate Covariance Among Alternatives, Econometric Research Program, Princeton University, Research Memo No. 292, published Dec. 1981.*
Small, Kenneth A. A Discrete Choice Model for Ordered Alternatives published in Econometrica, vol. 55, No. 2 (Mar. 1987) pp. 409-424.*
Klaus Zwerina, Joel Huber, and Warren Kuhfeld. A General Method for Constructing Efficient Choice Designs. Published Sep. 1996.*

* cited by examiner

*Primary Examiner* — Stephanie Delich
(74) *Attorney, Agent, or Firm* — Roylance, Abrams, Berdo & Goodman, L.L.P.; Stanislav Torgovitsky

(57) ABSTRACT

Systems and methods are provided applicable to all choice scenarios where alternative competition is a function of alternative proximity along some attribute dimension. Discrete choice models can be developed which assign probabilities that a given decision-maker will choose different alternatives. Ordered Generalized Extreme Value (OGEV) and Hybrid-OGEV models are utilized to assess the probability that a given alternative is chosen based on its attributes and the parameter estimates of these attributes (obtained during model estimation). The attribute parameter estimates yield the relative importance of each attribute to a decision-maker. The attribute importance can differ by decision-maker such that different decision-makers can have different parameter estimates for the same attribute.

37 Claims, 6 Drawing Sheets

SYSTEM AND METHOD FOR MODELING CONSUMER CHOICE BEHAVIOR

This application claims benefit under 35 U.S.C. § 119(e) from U.S. Provisional Patent Application Ser. Nos. 60/756, 566 filed on Jan. 6, 2006, the entire contents of which is incorporated herein by reference.

BACKGROUND OF THE INVENTION

1. Field of the Invention

The present invention generally relates to systems and methods for modeling choice scenarios where a decision-maker is capable of choosing one of multiple alternatives. More particularly, the present invention relates to systems and methods which implement discrete choice models that capture proximate covariance property of alternatives to model choice scenarios where alternative competition is a function of alternative proximity along some attribute dimension.

2. Discussion of the Background

The following references ("Reference(s)"), the entire contents of all of which is incorporated herein by references, provide a comprehensive listing of publications facilitating the understanding of, but are not limiting of, certain exemplary embodiments of the present invention:

1. Brown, S. L., and W. S. Watkins. The Demand for Air Travel: A Regression Study of Time-Series and Cross-Sectional Data in the U.S. Domestic Market. *Highway Research Record*, No. 213, 1968, pp. 21-34.
2. English, J. M., and G. L. Kernan. The Prediction of Air Travel and Aircraft Technology to the Year 2000 Using the Delphi Method. *Transportation Research, Vol.* 10, No. 1, 1976, pp. 1-8.
3. Transportation Research Circular 348. Aviation Forecasting Methodology: A Special Workshop. Transportation Research Board, National Research Council, Washington, D.C., 1989.
4. Mumayiz, S. A., and R. W. Pulling. Forecasting Air Passenger Demand in Multi-airport Regions. *Proceedings of the Transportation Research Forum*, TRF, Arlington, Va., USA, 1992.
5. Brown, S. L., and W. S. Watkins. Measuring Elasticities of Air Travel from New Cross-sectional Data. *Proceedings, Business and Economic Statistics Section of the American Statistical Association*, 1971, pp. 310-315.
6. Verleger, P. K. Jr. Models of the Demand for Air Transportation. *Bell Journal of Economics and Management Science*, Vol. 3, No. 2, 1972, pp. 437-457.
7. De Vany, A. S., and E. H. Garges. A Forecast of Air Travel and Airport and Airway Use in 1980. *Transportation Research*, Vol. 6, No. 1, 1972, pp. 1-18.
8. Douglas, G. W., and J. C. Miller III. Economic Regulation of Domestic Air Transport: Theory and Policy. *The Brookings Institution*, Washington, D.C., 1974.
9. De Vany, A. The Revealed Value of Time in Air Travel. *Review of Economics and Statistics*, Vol. 56, No. 1, 1974, pp. 77-82.
10. Kanafani, A. K., and S-L Fan. Estimating the Demand for Short-haul Air Transport Systems. In *Transportation Research Record. Journal of the Transportation Research Board*, No. 526, TRB, National Research Council, Washington D.C., 1974, pp. 1-15.
11. De Vany, A. S. The Effect of Price and Entry Regulation on Airline Output, Capacity and Efficiency. *The Bell Journal of Economics*, Vol. 6, No. 1, 1975, pp. 327-345.
12. Ippolito, R. A. Estimating Airline Demand with Quality of Service Variables. *Journal of Transport Economics and Policy*, Vol. 15, No. 1, 1981, pp. 7-15.
13. Anderson, J. E., and M. Kraus. Quality of Service and the Demand for Air Travel. *Review of Economics and Statistics*, Vol. 63, No. 4, 1981, pp. 533-540.
14. Abrahams, M. A Service Quality Model of Air Travel Demand: An Empirical Study. *Transportation Research—Part A*, Vol. 17, No. 5, 1983, pp. 385-393.
15. Reiss, P. C., and P. T. Spiller. Competition and Entry in Small Airline Markets. *Journal of Law and Economics*, Vol. 32, No. 2, 1989, pp. S179-S202.
16. Dresner, M., J-S C. Lin, and R. Windle. The Impact of Low-cost Carriers on Airport and Route Competition. *Journal of Transport Economics and Policy*, Vol. 30, No. 3, 1996, pp. 309-328.
17. Corsi, T., M. Dresner, and R. Windle. Air Passenger Forecasts: Principles and Practices. *Journal of the Transportation Research Forum*, Vol. 36, No. 2, 1997, pp. 42-62.
18. Skinner, R. E. Jr. Airport Choice: An Empirical Study. *Transportation Engineering Journal*, Vol. 102, No. TE4, 1976, pp. 871-882.
19. Augustinus, J. G., and S. A. Demakopoulos. Air Passenger Distribution Model for a Multiterminal Airport System. In *Transportation Research Record: Journal of the Transportation Research Board, No.* 673, TRB, National Research Council, Washington, D.C., 1978, pp. 176-180.
20. Harvey, G. Airport Choice in a Multiple Airport Region. *Transportation Research—Part A*, Vol. 21, No. 6, 1987, pp. 439-449.
21. Ashford, N., and M. Benchemam. Passengers' Choice of Airport: An Application of the Multinomial Logit Model. In *Transportation Research Record: Journal of the Transportation Research Board, No.* 1147, TRB, National Research Council, Washington, D.C., 1987, pp. 1-5.
22. Furuichi, M., and F. S. Koppelman. An Analysis of Air Travelers' Departure Airport and Destination Choice Behavior. *Transportation Research—Part A*, Vol. 28, No. 3, 1994, pp. 187-195.
23. Windle, R., and M. Dresner. Airport Choice in Multiple-airport Regions. *Journal of Transportation Engineering*, Vol. 121, No. 4, 1995, pp. 332-337.
24. Suzuki, Y., M. R. Crum, and M. J. Audino. Airport Choice, Leakage, and Experience in Single-airport Regions. *Journal of Transportation Engineering*, Vol. 129, No. 2, 2003, pp. 212-218.
25. Hess, S., and J. W. Polak. Mixed Logit Modeling of Airport Choice in Multi-airport Regions. *Journal of Air Transport Management*, Vol. 11, No. 2, 2005, pp. 59-68.
26. Basar, G., and C. Bhat. A Parameterized Consideration Set Model for Airport Choice: An Application to the San Francisco Bay Area. *Transportation Research—Part B*, Vol. 38, No. 10, 2004, pp. 889-904.
27. Nason, S. D. The Airline Preference Problem: An Application of Disaggregate Logit. *Presented at the AGIFORS Symposium*, Santa Barbara, Calif., USA, 1981.
28. Morash, E. A., and J. Ozment. The Strategic Use of Transportation Time and Reliability for Competitive Advantage. *Transportation Journal, Vol.* 36, No. 2, 1996, pp. 35-46.
29. Suzuki, Y., J. Tyworth, and R. Novack. Airline Market Share and Customer Service Quality: A Reference-dependent Model. *Transportation Research—Part A*, Vol. 35, No. 9, 2001, pp. 773-788.
30. Ghobrial, A., and S. Y. Soliman. An Assessment of Some Factors Influencing the Competitive Strategies of Airlines in Domestic Markets. *International Journal of Transport Economics*, Vol. 19, No. 3, 1992, pp. 247-258.
31. Nako, S. M. Frequent Flyer Programs and Business Travellers: An Empirical Investigation. *The Logistics and Transportation Review*, Vol. 28, No. 4, 1992, pp. 395-414.
32. Proussaloglou, K., and F. S. Koppelman. Air Carrier Demand: An Analysis of Market Share Determinants. *Transportation*, Vol. 22, No. 4, 1995, pp. 371-388.
33. Yoo, K., and N. Ashford. Carrier Choices of Air Passengers in Pacific Rim: Using Comparative Analysis and Complementary Interpretation of Revealed Preference and Stated Preference Data. In *Transportation Research Record: Journal of the Transportation Research Board*, No. 1562, TRB, National Research Council, Washington, D.C., 1996, pp. 1-7.
34. Algers, S., and M. Beser. A Model for Air Passengers Choice of Flight and Booking Class—A Combined Stated Preference and Reveled Preference Approach. *Presented at the ATRG Conference, Vancouver, Canada,* 1997.
35. Proussaloglou, K., and F. S. Koppelman. The Choice of Air Carrier, Flight, and Fare Class. *Journal of Air Transport Management*, Vol. 5, No. 4, 1999, pp. 193-201.
36. Bruning, E., and V. Rueda. The Importance of Frequent Flyer Programs as a Barrier to Entry into Air Travel Markets. *Journal of Transportation Law, Logistics and Policy*, Vol. 67, No. 4, 2000, pp. 367-380.
37. Morrison, M. Aggregation Biases in Stated Preference Studies. *Australian Economic Papers*, Vol. 39, No. 2, 2000, pp. 215-230.
38. Murphy, J. J., P. G. Allen, T. H. Stevens, and D. Weatherhead. A Meta-Analysis of Hypothetical Bias in Stated Preference Valuation. *Environmental and Resource Economics*, In Press.
39. OAG Worldwide Limited. *Official Airline Guide.* Bedfordshire, LU5 4HB, United Kingdom, 2001.
40. Data Base Products, Inc. *Superset.* Dallas, Tex., USA, 2001.
41. Aptech Systems, Inc. *GAUSS.* Maple Valley, Wash., USA, 2004.
42. Coldren, G. M., and F. S. Koppelman. Modeling the Competition among Air-travel Itinerary Shares: GEV Model Development. *Transportation Research—Part A*, Vol. 39, No. 4, 2005, pp. 345-365.
43. Bresnahan, T. F., S. Stem, and M. Trajtenberg. Market Segmentation and the Sources of Rents from Innovation: Personal Computers in the Late 1980s. *RAND Journal of Economics*, Vol. 28, No. 0 (Special Issue), 1997, pp. S17-S44.
44. McFadden, D. Modeling the Choice of Residential Location. In Transportation *Research Record Journal of the Transportation Research Board*, No. 673, TRB, National Research Council, Washington, D.C., 1978, pp. 72-77.
45. Small, K. A. A Discrete Choice Model for Ordered Alternatives. *Econometrica*, Vol. 55, No. 2, 1987, pp. 409-424.
46. Bhat, C. R. Analysis of Travel Mode and Departure Time Choice for Urban Shopping Trips. *Transportation Research—Part B, Vol.* 32, No. 6, 1998, pp. 361-371.
47. Small, Kenneth A., Approximate Generalized Extreme Value Models of Discrete Choice. *Journal of Econometrics* 62, pp. 351-382, North-Holland (1994).

At the outset, it is noted that the present invention is applicable to modeling of various choice scenarios, including, but not limited to transportation, consumer products and services, financial products, residential locations, etc. In this following description, certain exemplary aspects of the present invention, as well as the background, are described in the context of air-travel itineraries for the sake of simplicity and clarity of understanding, and by no means as limiting of the scope of the present invention.

Thus, for example, in the context of airline industry, air travelers are presented with a number of choice scenarios in the form of itinerary service characterized by, for example, level-of-service, connection quality, carrier attributes, aircraft (or other carrier) type and departure time. An air travelers is an example of a decision-maker that can choose a single travel itinerary between two destinations (two airports) from among a plurality of different itineraries. The choice of travel itineraries by the air travelers directly impact the number of passengers expected to travel on each itinerary between any airport-pair, and therefore, predicting the choice of itineraries aids carriers in numerous strategic-planning decisions essential for revenue management, schedule efficiency and profitability.

Conventional aviation demand studies have typically either forecasted air-travel demand for a given level of aggregation (for example, system (see References 1, 2, 3), metropolitan region (see Reference 4), city (airport) pair (see References 1, 5, 6, 7, 8, 9, 10, 11, 12, 13, 14, 15, 16, 17), airport (see References 18, 19, 20, 21, 22, 23, 24, 25, 26)) or dealt with the allocation of air-travel volumes to air-carriers at a given level of aggregation. Air-carrier allocation studies in the literature typically identify relationships between airline service attributes and the allocation of air-travel volumes. Air-travel demand allocation studies have focused on air-carrier share at the system (see References 27, 28, 29), airport-pair (see References 30, 31, 32) or point-to-point (nonstop) flight share level (see References 33, 34, 35, 36) but not at the itinerary level.

All the above mentioned studies fall into at least one of the following categories: 1) studies based on data with a high level of geographic aggregation, 2) studies employing surveys with a very limited range of airport-pairs or 3) studies based on stated preference data which may be subject to bias (see References 37, 38). Additionally, a major limitation of these studies is their failure to model air-travel demand at the level of individual itineraries, the products that are ultimately purchased by the air travelers.

The above-noted limitations are likewise found in systems and methods of modeling consumer choice behavior in other transportation-related industries, product and services supply industries, financial service supply industries, and other industries where modeling of consumer choice behavior may be used to, for example, facilitate revenue management, scheduling efficiency and profitability.

SUMMARY OF THE INVENTION

Exemplary embodiments of the present invention address at least the above problems and/or disadvantages and provide at least the advantages described below. Accordingly, aspects of the present invention provide systems and methods applicable to all choice scenarios where alternative competition is a function of alternative proximity along some attribute dimension. Exemplary implementations of the present invention utilize OGEV-type models, and are applicable to all instances where proximate covariance can be ascertained.

According to an exemplary embodiment of the present invention, a method modeling choice behavior is provided where a choice scenario for modeling, which has a plurality of alternatives, is selected. A sample of representative decision-makers capable of choosing at least one of the alternatives is obtained, and attributes associated with the alternatives are defined. Actual alternatives selected by the representative decision-makers are identified, and a parameterized discrete choice model structure is selected. After model parameters for the selected parameterized discrete choice model structure are estimated, a probability that a decision-maker presented with a choice of alternatives associated with the choice scenario will choose one of the alternative is determined using the selected parameterized discrete choice model structure with the estimated model parameters.

According to another exemplary embodiment of the present invention, a system for modeling consumer choice behavior is provided and includes an input for facilitating selection of a choice scenario for modeling. The choice scenario has a plurality of alternatives and attributes associated with the alternatives. The system includes a selector for selecting a parameterized discrete choice model structure. The system also includes a processor for estimating, using actual alternatives selected by a sample of representative decision-makers capable of choosing at least one of the alternatives, model parameters for the selected parameterized discrete choice model structure. The processor determines, using the selected parameterized discrete choice model structure with the estimated model parameters, a probability that a decision-maker presented with a choice of alternatives associated with the choice scenario will choose the at least one of the alternatives.

According to yet another exemplary embodiment of the present invention, a computer-readable recording medium is provided having recorded thereon computer-executable instructions which facilitate modeling of consumer choice behavior according to the present invention.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF EXEMPLARY EMBODIMENTS

Figure 1:
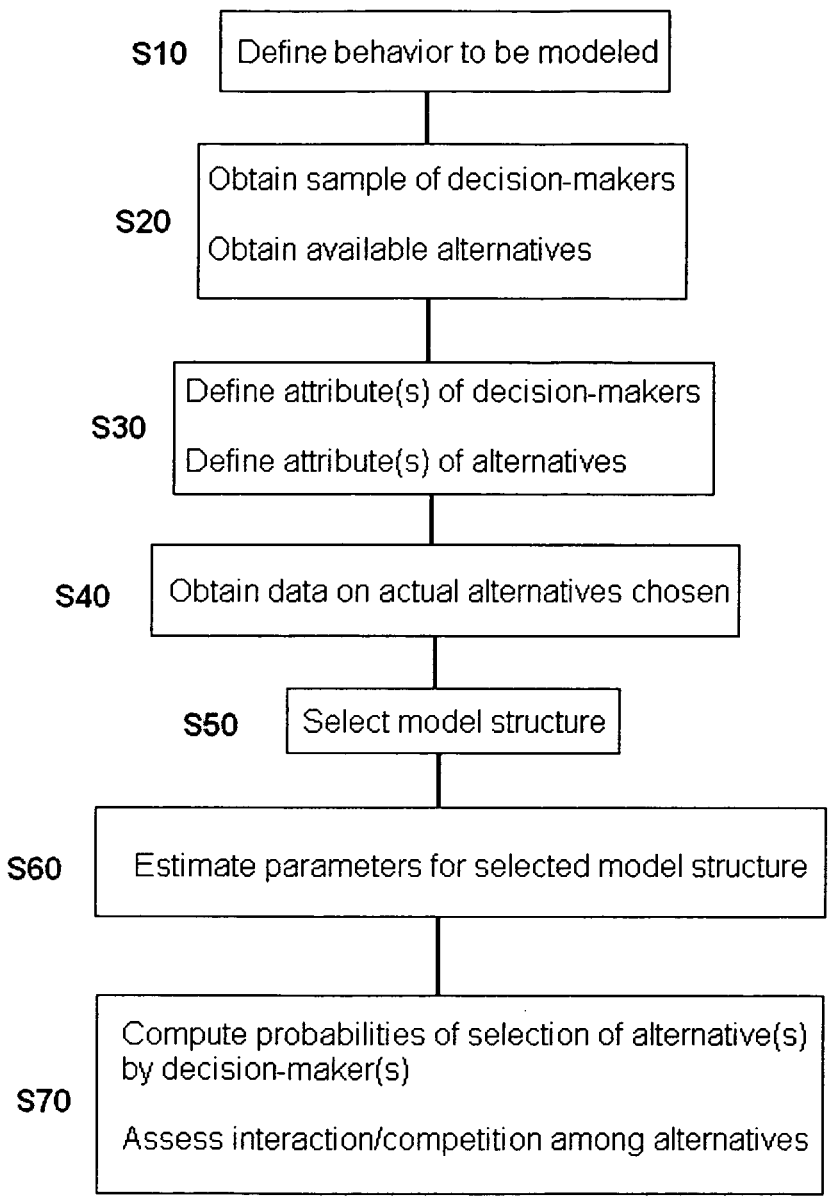
FIG. 1 is a flowchart illustrating process flow according to an exemplary implementation of the present invention.

Referring now to the drawings, wherein like reference numerals designate identical or corresponding parts throughout the several views, embodiments of the present invention are shown in schematic detail.

The matters defined in the description such as a detailed construction, elements and method steps are nothing but the ones provided to assist in a comprehensive understanding of the invention. Accordingly, those of ordinary skill in the art will recognize that various changes and modifications of the embodiments described herein can be made without departing from the scope and spirit of the invention. Also, well-known functions, method steps or constructions are omitted for clarity and conciseness.

As noted above, while in the following description certain embodiments of the present invention have been illustrated in the context of air travel, one of ordinary skill in the art will readily appreciate that the embodiments of the present invention are also applicable to other transportation systems such as trains, buses and/or ships. Likewise, embodiments of the present invention are applicable to various consumer products and services, financial products, residential locations, and other products and services where a decision-maker is faces with a choice from a set of mutually exclusive and collectively exhaustive discrete alternatives.

In an exemplary implementation of certain embodiments of the present invention, the alternatives define the choice scenario being modeled. Each alternative and decision-maker can be described by a set of attributes. For example, for the air-travel itinerary choice scenario, alternative attributes can be price, travel time, connection quality, number of stops, equipment type(s), departure/arrival time, etc. On the other hand, in the case of consume product such as a television choice scenario, alternative attributes could be price, screen size, resolution, etc. Decision-maker attributes can be, for example, gender, income, age, etc.

In general, for a given discrete choice scenario, it is not possible to determine how a given decision-maker will choose. However, discrete choice models can be developed which assign probabilities that a given decision-maker will choose different alternatives. According to exemplary embodiments of the present invention, Ordered Generalized Extreme Value (OGEV) and Hybrid-OGEV models are utilized.

According to exemplary implementations of the present invention, in the OGEV and hybrid-OGEV models (and many other models), the probability a given alternative is chosen is a function of its attributes and the parameter estimates of these attributes (obtained during model estimation). The attribute parameter estimates yield the relative importance of each attribute to the decision-maker. The attribute importance can differ by decision-maker such that different decision-makers can have different parameter estimates for the same attribute. For example, lower income decision-makers may be more sensitive to price than higher income decision-makers). Alternative attributes and their parameter estimates are described below in more detail with reference to Equation 1.

According to exemplary implementations of the present invention, in the OGEV and hybrid-OGEV models (and other models), parameter estimates are also estimated for logsum and allocation variables. The logsum and allocation parameter estimates capture inter-alternative competition dynamics. For example, all things being equal, air-travel itineraries that are closer to each other in departure time will "compete" more with each other than itineraries that are further apart in departure time; also, television sets within the same brand may "compete" more with each other than with sets of other brands. The logsum and allocation parameter estimates (obtained in the model estimation) capture hypothesized competition dynamics among alternatives as described below in more detail.

According to exemplary implementations of the present invention, once OGEV and hybrid-OGEV models are estimated, alternative probabilities (or shares) are a function of each alternatives attributes, attribute parameter estimates, logsum parameter estimates, and allocation parameter estimates. The exemplary specification of the OGEV and hybrid-OGEV models are described below in more detail with reference to Equations 2, 2a, 2b, 7, 8.

According to exemplary implementations of the present invention, OGEV and hybrid-OGEV models can capture the proximate covariance property of alternatives (if such a relationship exists). This property exists if alternatives compete more with each other the "closer" they are to each other (along a given attribute dimension). For example, in the context of air-travel, the itineraries exhibit proximate covariance along the time-of-day (attribute) dimension. However, the attribute dimension doesn't have to be continuous. For example, it is theoretically possible that a 40 inch television set will compete most closely with a 42 inch set, less with a 44 inch set, less still with a 46 inch set, etc. Certain exemplary implementations of the present invention can be applicable to either or both continuous and discontinuous attribute dimensions.

Broadly, exemplary implementations of the present invention, are applicable to essentially all applications of the OGEV-type models, and even more broadly to all instances where proximate covariance is applicable. That is, exemplary embodiments of the present invention can be applied to all choice scenarios where alternative competition is a function of alternative proximity along some attribute dimension.

Referring to FIG. 1, an exemplary implementation of OGEV/Hybrid-OGEV model process flow in a system and method according to exemplary embodiments of the present invention is as follows.

As the outset, a consumer choice behavior that needs to be modeled is defined (step S10). Examples of consumer choice behavior include, but are not limited to: air-travel itinerary selection, residential location, how many vehicles/TV's/ovens to own, financial product selection (stocks, bonds, options), etc. Then, for a given scenario in step S10, the data containing the following are obtained:

A sample of consumers facing the given consumer-choice scenario (i.e. air-travelers who are booking an itinerary), and choices (alternatives) available to consumers in the sample (individuals in the sample can have different choices available to them)—step S20.

Attributes of each of the choices (in the air-travel itinerary example, this can include: # of stops, fare, carrier, departure time, etc.) and attributes of the different decision-makers (gender, income, age, marital status, etc.)—step S30.

The choices these consumers actually made—step S40. This data can either be obtained from history (revealed preference (RP) data) or it can be constructed. Constructed data is obtained by giving a survey to a sample of consumers where the survey contains choice scenarios and asks for their selected hypothetical choice given the available choices. Data obtained in this method is referred to as stated preference (SP) data.

Depending on the type of consumer choice behavior (from step S10) that needs to be modeled (including the modelers' opinion about the "interactions" among the choice alternatives), a parameterized "discrete choice model" structure is selected in step S50. Such models include multinomial logit (MNL) and nested logit (NL). According to exemplary implementations of the present invention, the selected model is the ordered generalized extreme value (OGEV) model or one of "hybrid" ordered generalized extreme value (hybrid-OGEV) models described below in more detail. Using the sample data from steps S20-S40 and customized modeling software, the parameters for the model structure selected in step S50 are estimates in step S60 using, for example, maximum likelihood techniques.

Computation results form the model structure selected in step S50 along based on the parameters obtained in step S60 are obtained in step S70 and include:

The probabilities that a given consumer facing the scenario in step S10 will choose the different alternatives in their choice set (when these probabilities are applied to a group of consumers, market share forecasts can be obtained).

The interaction/competition among the alternatives. For example, if the characteristics of an 8 A.M. air-travel itinerary are altered (making it less appealing, for example), the amount of market share taken away by, for example, the 9 A.M itinerary, or by the 10 A.M. itinerary can be assessed.

According to an exemplary embodiment of the present invention, a system and method provide estimation of advanced air-travel itinerary share models formulated to capture inter-itinerary competition dynamics along the time of day dimension. These models predict airline (or other transportation systems, such as trains and buses) ridership at the itinerary level and aid carriers in long and intermediate term decision-making. Previous estimations by the inventors indicated increased competition among air-travel itineraries within broad time periods. According to an aspect of the present invention, a more realistic time-of-day competition dynamic is modeled by using the ordered generalized extreme value (OGEV) model and "hybrid" OGEV models.

The exemplary hybrid OGEV models incorporate the traditional OGEV model structure with other generalized extreme value components such as the nested logit and weighted nested logit model structures. These hybrid OGEV models measure inter-itinerary competition along the carrier and/or level-of-service dimensions along with the time of day dimension. The estimated OGEV models have the property of proximate covariance where itineraries that are "closer" to each other by departure time exhibit greater covariance and, therefore, greater substitution/competition with each other than with itineraries that are more separated in time.

Independent variables for the models according to exemplary embodiments of the present invention measure itinerary service characteristics such as level-of-service, connection quality, carrier attributes, aircraft (or other carrier) type and departure time. Various exemplary embodiments of the present invention offer insights into air-traveler (as well as land and sea travel) behavior, with the advanced models outperforming the more basic specifications with regard to statistical tests and behavioral interpretations.

Certain exemplary embodiments of the present invention provide advanced air-travel itinerary share models that capture inter-itinerary competition dynamics along the time of day dimension (as well as the carrier and level-of-service dimensions). One of the motivating factors for developing these models was the belief that—within, for example, an airport-pair—the degree of competition among itineraries linking the airport-pair is differentiated by proximity in departure time. Itinerary share models forecast the number of passengers expected to travel on each itinerary between any airport-pair (conditional on the forecasted airport-pair passenger volume) and aid carriers in numerous strategic-planning decisions. These models provide carriers with an understanding of the relative importance of different service factors on airport-pair itinerary share. Additionally, advanced itinerary share models describe the underlying competitive dynamic among air-travel itineraries. Improvements to a carrier's itinerary share model leads to improvements in its forecasting ability, which translates to improvements in revenue management, schedule efficiency and profitability.

In an exemplary implementation, an itinerary's value is a linear function of explanatory variables (attributes, represented by the $X_k$s) and their corresponding parameter estimates (represented by the $\beta_k$s).

The variables in the context of certain exemplary embodiments of the present invention are service characteristics describing each itinerary such as level-of-service indicators, connection quality measurements, carrier attributes, aircraft type and time of day variables as described in Table 1 which is reproduced below.

TABLE 1

Description of Explanatory Variables

| Variable | Description |
| --- | --- |
| Level-of-Service | Dummy variables representing the level-of-service of the itinerary (nonstop, direct, single-connect, double-connect) with respect to the best level-of-service available in the airport-pair. |
| Second-Best Connection | For connection itineraries sharing a common leg, a dummy variable indicating that the itinerary is not the best connection (with respect to ground time) for the given incoming or outgoing leg at a transfer station. |
| Second-Best Connection Time Difference | If the second-best connection indicator equals one, this variable measures the ground time difference between the itinerary and the best connection itinerary. |
| Distance Ratio | Itinerary distance divided by the shortest itinerary distance for the airport-pair multiplied by 100. |
| Best Connection Time Difference | Elapsed time difference between an itinerary involving a stop or connection and the fastest itinerary involving a stop or connection for each airport-pair independent of transfer airport. |
| Fare Ratio | Carrier average fare divided by the industry average fare for the airport-pair multiplied by 100. |
| Carrier | Dummy variables representing major U.S. domestic carriers. All other carriers are combined together in a single category. |
| Code share | Dummy variable indicating whether any leg of the itinerary was booked as a code share. |
| Regional Jet | Dummy variable indicating whether the smallest aircraft on any part of the itinerary is a regional jet. |
| Propeller Aircraft | Dummy variable indicating whether the smallest aircraft on any part of the itinerary is a propeller aircraft. |
| Departure Time | Dummy variables for each hour of the day (based on the local departure time of the first leg of the itinerary). |

An itinerary, in the context of certain exemplary embodiments of the present invention, is a leg (flight number) or sequence of legs connecting a given airport-pair. Itineraries are either nonstop, direct (an itinerary with a stop involving no airplane change), single-connect (a connecting itinerary with an airplane change) or double-connect (an itinerary involving two connections). In the context of certain exemplary embodiments of the present invention, these four classifications are referred to as an itinerary's "level-of-service". On any given day, an airport-pair may be served by hundreds of itineraries, each of which offers travelers a potential way to travel between the airports. Once itinerary shares are predicted for all airport-pairs, these forecasts can be assigned to flight legs and summed to obtain carrier share at the flight-leg, airport-pair, region, system or any other level of aggregation.

The itinerary share models according to certain embodiments of the present invention use an aggregate logit share technique. Value, the aggregate analog of utility, is used to represent the relative desirability of each itinerary. The market share assigned to each itinerary is modeled as a function of the value of the itinerary and the values of all other itineraries serving the airport-pair for a given day of the week. For itinerary i, its value, $V_i$, is assumed to be linear-in-parameters where:

$$V_i = \beta_1 X_{1i} + \beta_2 X_{2i} + \ldots + \beta_n X_{ni}.\quad (1)$$

According to an exemplary implementation, a study can be based on comprehensive bookings and schedule data. Bookings data can be obtained from a compilation of computer reservation systems (CRS), a data source containing detailed records of individual booked itineraries. Leg-based air-carrier schedule information can be obtained as described in Reference 39 and fare data can be obtained as described in Reference 40. Detailed itinerary-level fare can be used, but is not required for such a study. Rather, average fare by carrier (across itineraries) for each airport-pair can be employed as an independent variable in the itinerary share models. This may be one of the better fare data currently available for a revealed preference air-carrier demand allocation study.

According to an exemplary implementation of the present invention, major carrier's itinerary building engine can be used to generate the set of feasible itineraries between the airport-pairs using the leg-based schedule data. Itineraries are generated for each day of the week keeping in mind the days of the week that each itinerary's flight leg(s) operates. The dependent variable in the models is the number of passengers who booked each itinerary. This can be determined by merging the generated itineraries with the CRS booked itineraries. The choice (alternative) sets can be modeled as the set of all itineraries between each airport-pair for each day of the week. For example, using May 2001 data, models were estimated with maximum likelihood techniques using all airport-pairs between the East and West (as determined by time zone) regions of the United States and Canada using the GAUSS modeling software (see Reference 41).

Even though the bookings data employed in exemplary implementations of certain embodiments of the present invention is based on the choices of individual travelers, it does not include any information on the demographic characteristics of the individual that made the booking or any trip-related characteristics of the booking. Thus, since no individual data is available to identify differences among travelers, it may not be appropriate to count the full weight of the individual observations in calculating the statistics for these models. One of the more extreme adjustment is to divide the log-likelihood values for the models by the ratio of the number of booked passengers to the number of airport-pair, day-of-the-week combinations (469,078/14,893=31.50); and the t-statistics by the square root of this ratio (5.61). Statistics discussed in the following sections and presented in Tables 2-4 (parameter estimates in bold in Tables 2-4 are not significant at the 0.05 level after the adjustment procedure) refer to both the unadjusted and adjusted values.

Previous work by the inventors (see Reference 42) showed that inter-itinerary competition is not "uniform" and demonstrated the importance of considering the differential competition among air-travel itineraries connecting airport-pairs. In particular, variations of the nested logit (NL) model structure were developed showing that inter-itinerary competition is differentiated by proximity in departure time, carrier and (to a lesser extent) level-of-service. Table 2 presents the estimation results of these previously estimated models. These are a "base" multinomial logit model; a two-level NL model with itineraries nested by time of day; two three-level NL models with itineraries nested at the upper level by time of day and nested at the lower level by level-of-service and carrier respectively; and a three-level weighted nested logit (WNL) model containing parallel three-level nesting structures with time of day on the upper level (in both structures) and level-of-service and carrier on the lower levels, with a weight parameter indicating the relative importance of each structure. Tables 2-4 are reproduced below.

TABLE 2

Itinerary Share Models: MNL, Two-Level NL, Three-Level NL's and Three-Level WNL

| Explanatory Variables | MNL | 2-Level NL: Time | 3-Level NL: Time, LOS | 3-Level NL: Time, Carrier | 3-Level WNL: T|C, T|L |
|---|---|---|---|---|---|
| Level-of-Service | | | | | |
| Nonstop Itinerary in Nonstop Market | 0.0000 | 0.0000 | 0.0000 | 0.0000 | 0.0000 |
| Direct Itinerary in Nonstop Market | −1.9595 | −1.6271 | −1.6479 | −1.6570 | −1.6754 |
| Single-Connect Itinerary in Nonstop Market | −2.8371 | −2.3540 | −2.3401 | −2.3802 | −2.3703 |
| Double-Connect Itinerary in Nonstop Market | −6.6264 | −5.4663 | −5.5099 | −5.2215 | −5.2649 |
| Direct Itinerary in Direct Market | 0.0000 | 0.0000 | 0.0000 | 0.0000 | 0.0000 |
| Single-Connect Itinerary in Direct Market | −0.7370 | −0.6207 | −0.5935 | −0.6362 | −0.6096 |
| Double-Connect Itinerary in Direct Market | −3.9250 | −3.2331 | −3.2467 | −3.1347 | −3.1467 |
| Single-Connect Itinerary in Single-Connect Market | 0.0000 | 0.0000 | 0.0000 | 0.0000 | 0.0000 |
| Double-Connect Itinerary in Single-Connect Market | −2.6015 | −2.1915 | −2.2118 | −2.1679 | −2.1869 |
| Connection Quality | | | | | |
| Second-Best Connection | −0.4208 | −0.3331 | −0.3290 | −0.2504 | −0.2473 |
| Second-Best Connection Time Difference | −0.0087 | −0.0071 | −0.0071 | −0.0063 | −0.0062 |
| Distance Ratio | −0.0135 | −0.0109 | −0.0108 | −0.0112 | −0.0111 |
| Best Connection Time Difference | −0.0056 | −0.0047 | −0.0047 | −0.0049 | −0.0048 |
| Carrier Attributes | | | | | |
| Fare Ratio | −0.0060 | −0.0052 | −0.0051 | −0.0036 | −0.0036 |
| Carrier Constants (Proprietary) | — | — | — | — | — |
| Code share | −1.8601 | −1.5241 | −1.5082 | −1.5408 | −1.5257 |
| Aircraft Type | | | | | |
| Mainline Jet | 0.0000 | 0.0000 | 0.0000 | 0.0000 | 0.0000 |
| Regional Jet | −0.4560 | −0.3856 | −0.3827 | −0.4019 | −0.3985 |
| Propeller Aircraft | −0.4201 | −0.3496 | −0.3459 | −0.3294 | −0.3258 |
| Departure Time | | | | | |
| 5-6 A.M. | −0.2184 | −0.1931 | −0.1925 | −0.2152 | −0.2139 |
| 6-7 A.M. | 0.0000 | 0.0000 | 0.0000 | 0.0000 | 0.0000 |
| 7-8 A.M. | 0.1385 | 0.1118 | 0.1099 | 0.1163 | 0.1146 |
| 8-9 A.M. | 0.2381 | 0.1907 | 0.1880 | 0.1944 | 0.1918 |
| 9-10 A.M. | 0.2646 | 0.2135 | 0.2108 | 0.2148 | 0.2125 |
| 10-11 A.M. | 0.2672 | 0.1873 | 0.1850 | 0.1971 | 0.1950 |
| 11-12 noon | 0.2290 | 0.1643 | 0.1625 | 0.1808 | 0.1791 |
| 12-1 P.M. | 0.2476 | 0.1761 | 0.1740 | 0.1845 | 0.1824 |
| 1-2 P.M. | 0.1614 | 0.1043 | 0.1029 | 0.1152 | 0.1140 |
| 2-3 P.M. | 0.1686 | 0.1058 | 0.1045 | 0.1175 | 0.1163 |
| 3-4 P.M. | 0.1856 | 0.1219 | 0.1199 | 0.1328 | 0.1309 |
| 4-5 P.M. | 0.0960 | 0.0486 | 0.0455 | 0.0577 | 0.0550 |
| 5-6 P.M. | 0.0972 | 0.0490 | 0.0457 | 0.0383 | 0.0355 |
| 6-7 P.M. | 0.1760 | 0.1179 | 0.1139 | 0.1068 | 0.1032 |
| 7-8 P.M. | 0.0833 | 0.0443 | 0.0416 | 0.0546 | 0.0521 |
| 8-9 P.M. | −0.0803 | −0.0807 | −0.0818 | −0.0586 | −0.0599 |
| 9-10 P.M. | −0.2587 | −0.2243 | −0.2234 | −0.1982 | −0.1973 |
| 10-Midnight | −0.3407 | −0.3179 | −0.3161 | −0.2821 | −0.2807 |

TABLE 2-continued

Itinerary Share Models: MNL, Two-Level NL, Three-Level NL's and Three-Level WNL

| Explanatory Variables | MNL | 2-Level NL: Time | 3-Level NL: Time, LOS | 3-Level NL: Time, Carrier | 3-Level WNL: T\|C, T\|L |
|---|---|---|---|---|---|
| Inverse Logsum Parameter (Time) | — | 1.2244 | — | — | — |
| Upper-Level Inverse Logsum Parameter (Time) | — | — | 1.2124 | 1.0667 | 1.0594 |
| Lower-Level Inverse Logsum Parameter (Carrier) | — | — | — | 1.3568 | 1.3642 |
| Lower-Level Inverse Logsum Parameter (LOS) | — | — | 1.2376 | — | 1.5492 |
| Weight Parameter (Time\|Carrier Structure) | — | — | — | — | 0.9529 |
| Log Likelihood at Zero | −2,173,197 | −2,173,197 | −2,173,197 | −2,173,197 | −2,173,197 |
| Log Likelihood at Convergence | −1,558,186 | −1,557,443 | −1,557,435 | −1,554,227 | −1,554,219 |
| Adjusted Log Likelihood at Convergence | −49,466 | −49,443 | −49,442 | −49,341 | −49,340 |
| Rho-square w.r.t. Zero | 0.2830 | 0.2833 | 0.2833 | 0.2848 | 0.2848 |

TABLE 3

Itinerary Share Models: Two and Three-Allocation OGEV's

| Explanatory Variables | 2-Allocation OGEV | 3-Allocation OGEV |
|---|---|---|
| Level-of-Service | | |
| Nonstop Itinerary in Nonstop Market | 0.0000 | 0.0000 |
| Direct Itinerary in Nonstop Market | −1.6049 | −1.5549 |
| Single-Connect Itinerary in Nonstop Market | −2.3157 | −2.2380 |
| Double-Connect Itinerary in Nonstop Market | −5.3363 | −5.1295 |
| Direct Itinerary in Direct Market | 0.0000 | 0.0000 |
| Single-Connect Itinerary in Direct Market | −0.6106 | −0.5905 |
| Double-Connect Itinerary in Direct Market | −3.1604 | −3.0386 |
| Single-Connect Itinerary in Single-Connect Market | 0.0000 | 0.0000 |
| Double-Connect Itinerary in Single-Connect Market | −2.1618 | −2.0988 |
| Connection Quality | | |
| Second-Best Connection | −0.3161 | −0.2966 |
| Second-Best Connection Time Difference | −0.0070 | −0.0067 |
| Distance Ratio | −0.0107 | −0.0102 |
| Best Connection Time Difference | −0.0046 | −0.0044 |
| Carrier Attributes | | |
| Fare Ratio | −0.0051 | −0.0050 |
| Carrier Constants (Proprietary) | — | — |
| Code share | −1.4842 | −1.4229 |
| Aircraft Type | | |
| Mainline Jet | 0.0000 | 0.0000 |
| Regional Jet | −0.3764 | −0.3631 |
| Propeller Aircraft | −0.3435 | −0.3329 |
| Departure Time | | |
| 5-6 A.M. | −0.1825 | −0.1749 |
| 6-7 A.M. | 0.0000 | 0.0000 |
| 7-8 A.M. | 0.2335 | 0.2050 |
| 8-9 A.M. | 0.3132 | 0.2808 |
| 9-10 A.M. | 0.3360 | 0.2993 |
| 10-11 A.M. | 0.3069 | 0.2991 |
| 11-12 noon | 0.2812 | 0.2532 |
| 12-1 P.M. | 0.2978 | 0.2622 |
| 1-2 P.M. | 0.2321 | 0.2052 |
| 2-3 P.M. | 0.2285 | 0.1957 |
| 3-4 P.M. | 0.2425 | 0.2348 |
| 4-5 P.M. | 0.1883 | 0.1677 |
| 5-6 P.M. | 0.1888 | 0.1686 |
| 6-7 P.M. | 0.2507 | 0.2293 |
| 7-8 P.M. | 0.0638 | 0.0756 |
| 8-9 P.M. | −0.0521 | −0.0371 |
| 9-10 P.M. | −0.1814 | −0.1612 |
| 10-Midnight | −0.2607 | −0.2412 |
| Inverse Logsum Parameter | 1.2607 | 1.3182 |
| Alpha 1 (Allocation Parameter) | 0.2215 | 0.0728 |
| Alpha 2 (Allocation Parameter) | — | 0.2520 |
| Log Likelihood at Zero | −2,173,197 | −2,173,197 |
| Log Likelihood at Convergence | −1,557,214 | −1,556,869 |
| Adjusted Log Likelihood at Convergence | −49,435 | −49,424 |
| Rho-square w.r.t. Zero | 0.2834 | 0.2836 |

TABLE 4

Itinerary Share Models: Three-Level NL-OGEV's and Three-Level WNL-OGEV

| Explanatory Variables | 3-Level NL-OGEV (2-Allocation): Time\|LOS | 3-Level NL-OGEV (2-Allocation): Time\|Carrier | 3-Level NL-OGEV (3-Allocation): Time\|Carrier | 3-Level WNL-OGEV (2-Allocation): T\|C, T\|L |
|---|---|---|---|---|
| Level-of-Service | | | | |
| Nonstop Itinerary in Nonstop Market | 0.0000 | 0.0000 | 0.0000 | 0.0000 |
| Direct Itinerary in Nonstop Market | −1.6459 | −1.6060 | −1.5840 | −1.6469 |
| Single-Connect Itinerary in Nonstop Market | −2.3144 | −2.3175 | −2.2837 | −2.3053 |

TABLE 4-continued

Itinerary Share Models: Three-Level NL-OGEV's and Three-Level WNL-OGEV

| | Model | | | |
|---|---|---|---|---|
| Explanatory Variables | 3-Level NL-OGEV (2-Allocation): Time\|LOS | 3-Level NL-OGEV (2-Allocation): Time\|Carrier | 3-Level NL-OGEV (3-Allocation): Time\|Carrier | 3-Level WNL-OGEV (2-Allocation): T\|C, T\|L |
| Double-Connect Itinerary in Nonstop Market | −5.4438 | −4.9888 | −4.8732 | −5.1164 |
| Direct Itinerary in Direct Market | 0.0000 | 0.0000 | 0.0000 | 0.0000 |
| Single-Connect Itinerary in Direct Market | −0.5766 | −0.6203 | −0.6148 | −0.5710 |
| Double-Connect Itinerary in Direct Market | −3.2063 | −3.0155 | −2.9596 | −3.0597 |
| Single-Connect Itinerary in Single-Connect Market | 0.0000 | 0.0000 | 0.0000 | 0.0000 |
| Double-Connect Itinerary in Single-Connect Market | −2.2079 | −2.1151 | −2.0968 | −2.1635 |
| Connection Quality | | | | |
| Second-Best Connection | −0.3123 | −0.2144 | −0.1936 | −0.2084 |
| Second-Best Connection Time Difference | −0.0069 | −0.0059 | −0.0057 | −0.0058 |
| Distance Ratio | −0.0107 | −0.0107 | −0.0101 | −0.0105 |
| Best Connection Time Difference | −0.0046 | −0.0048 | −0.0048 | −0.0047 |
| Carrier Attributes | | | | |
| Fare Ratio | −0.0051 | −0.0034 | −0.0034 | −0.0033 |
| Carrier Constants (Proprietary) | — | — | — | — |
| Code share | −1.4720 | −1.4865 | −1.4594 | −1.4593 |
| Aircraft Type | | | | |
| Mainline Jet | 0.0000 | 0.0000 | 0.0000 | 0.0000 |
| Regional Jet | −0.3749 | −0.3947 | −0.3894 | −0.3892 |
| Propeller Aircraft | −0.3409 | −0.3176 | −0.3138 | −0.3118 |
| Departure Time | | | | |
| 5-6 A.M. | −0.1829 | −0.1911 | −0.1922 | −0.1894 |
| 6-7 A.M. | 0.0000 | 0.0000 | 0.0000 | 0.0000 |
| 7-8 A.M. | 0.2356 | 0.2638 | 0.2308 | 0.2675 |
| 8-9 A.M. | 0.3151 | 0.3407 | 0.3092 | 0.3430 |
| 9-10 A.M. | 0.3380 | 0.3622 | 0.3193 | 0.3651 |
| 10-11 A.M. | 0.3047 | 0.3424 | 0.3363 | 0.3437 |
| 11-12 noon | 0.2790 | 0.3205 | 0.2747 | 0.3221 |
| 12-1 P.M. | 0.2958 | 0.3370 | 0.2833 | 0.3385 |
| 1-2 P.M. | 0.2327 | 0.2645 | 0.2196 | 0.2678 |
| 2-3 P.M. | 0.2288 | 0.2572 | 0.2067 | 0.2602 |
| 3-4 P.M. | 0.2415 | 0.2718 | 0.2534 | 0.2735 |
| 4-5 P.M. | 0.1911 | 0.2201 | 0.1878 | 0.2246 |
| 5-6 P.M. | 0.1912 | 0.2060 | 0.1840 | 0.2103 |
| 6-7 P.M. | 0.2523 | 0.2678 | 0.2471 | 0.2703 |
| 7-8 P.M. | 0.0600 | 0.0948 | 0.1058 | 0.0910 |
| 8-9 P.M. | −0.0531 | −0.0014 | 0.0122 | −0.0014 |
| 9-10 P.M. | −0.1794 | −0.1141 | −0.0944 | −0.1089 |
| 10-Midnight | −0.2585 | −0.2018 | −0.1837 | −0.1986 |
| Upper-Level OGEV Inverse Logsum Parameter (Time) | 1.2325 | 1.0896 | 1.1087 | 1.0698 |
| Lower-Level NL Inverse Logsum Parameter (Carrier) | — | 1.4539 | 1.5196 | 1.4778 |
| Lower-Level NL Inverse Logsum Parameter (LOS) | 1.2718 | — | — | 1.5765 |
| Alpha 1 (Allocation Parameter) | 0.1903 | 0.1787 | 0.0205 | 0.1648 |
| Alpha 2 (Allocation Parameter) | — | — | 0.2425 | — |
| Weight Parameter (Time\|Carrier Structure) | — | — | — | 0.9012 |
| Log Likelihood at Zero | −2,173,197 | −2,173,197 | −2,173,197 | −2,173,197 |
| Log Likelihood at Convergence | −1,557,199 | −1,553,430 | −1,552,661 | −1,553,397 |
| Adjusted Log Likelihood at Convergence | −49,435 | −49,315 | −49,291 | −49,314 |
| Rho-square w.r.t. Zero | 0.2835 | 0.2852 | 0.2855 | 0.2852 |

The formulation of the WNL model is similar to the formulation of the principles of differentiation (PD) model developed by Bresnahan et al. (see Reference 43). All of these models have a common value function specification (the same specification is used in all models contained in this paper as well) and are all members of the generalized extreme value (GEV) family of models (see Reference 44). A detailed interpretation of these models can be found in (see Reference 42). The motivation for developing these non-MNL models was the belief that the independence of irrelevant alternatives (IIA) property inherent in the MNL model is unrealistic in the context of air-travel itinerary share modeling since it is likely that substitution among itineraries is differentiated along the dimensions of time of day, carrier and/or level-of-service.

Variations of the nested logit model (those that nest itineraries by departure time) group itineraries by arbitrary time periods and recognize differences in competition only between and within the pre-defined time periods (nests). This imposes unrealistic constraints on the time-of-day competition dynamic. For example, it implies that an itinerary within a given nest will compete more closely with an itinerary sharing the nest than with an itinerary in an adjacent nest that is closer in departure time.

The models according to certain aspects of the present invention, capture a more complicated and realistic itinerary competition structure (for the time of day dimension) than the variations of the nested logit model. It is hypothesized that—within an airport-pair—the amount of competition between itineraries is differentiated by the proximity in their departure times. This property, named "proximate covariance" by Small (see Reference 45), implies that itineraries that are "closer" to each other (by departure time) exhibit a higher amount of substitution/competition with each other than with itineraries that are more separated in time. The level of substitution/competition between itineraries increases the closer they are to each other. Models estimated in this paper capture this property by grouping (nesting) itineraries (according to their departure times) into narrow time periods and ordering these time periods from early morning to late evening. These models are consistent with the hypothesis that an itinerary will compete most closely with itineraries in the same narrow time period and less closely as the difference in time periods increases.

The following description begins by estimating several ordered generalized extreme value (OGEV) models (see Reference 45). Small's development of the OGEV model was for the case of distinctly ordered alternatives (for example, a household decision scenario of how many automobiles to own). Bhat (see Reference 46) used a combined MNL-OGEV structure to model mode and departure time choice for distinct trips. According to exemplary embodiments of the present invention, the OGEV structure is used to model the underlying competition among air-travel itineraries (for a given airport-pair-day-of-the-week) along the time of day dimension. As described in further detail below, the nesting structure of these models consists of overlapping time periods where each itinerary is allocated to contiguous nests according to allocation parameters. The values and significance of these allocation parameters indicate whether the assumption underlying the OGEV model (that is, the proximate covariance property) is valid (that is, whether the hypothesis that the nested logit model is adequate to describe the time of day competition dynamic can be rejected).

As demonstrated (using variations of the nested logit model) (see Reference 42), it is desirable to model the intra-carrier (and potentially intra-level-of-service) competition dynamic within an upper-level time of day structure. The OGEV models described in the preceding paragraph cannot accomplish this (since they only model the inter-itinerary competition dynamic along the time of day dimension). To address this, "hybrid" OGEV models are developed according to certain aspects of the present invention. These models incorporate, for example, an OGEV model structure (described above) at the upper level with a GEV component such as the NL model at the lower level. Modeling air-travel itinerary shares using hybrid OGEV specifications (representing realistic and complicated substitution dynamics) is an important step forward for aviation demand modeling.

Figure 2:
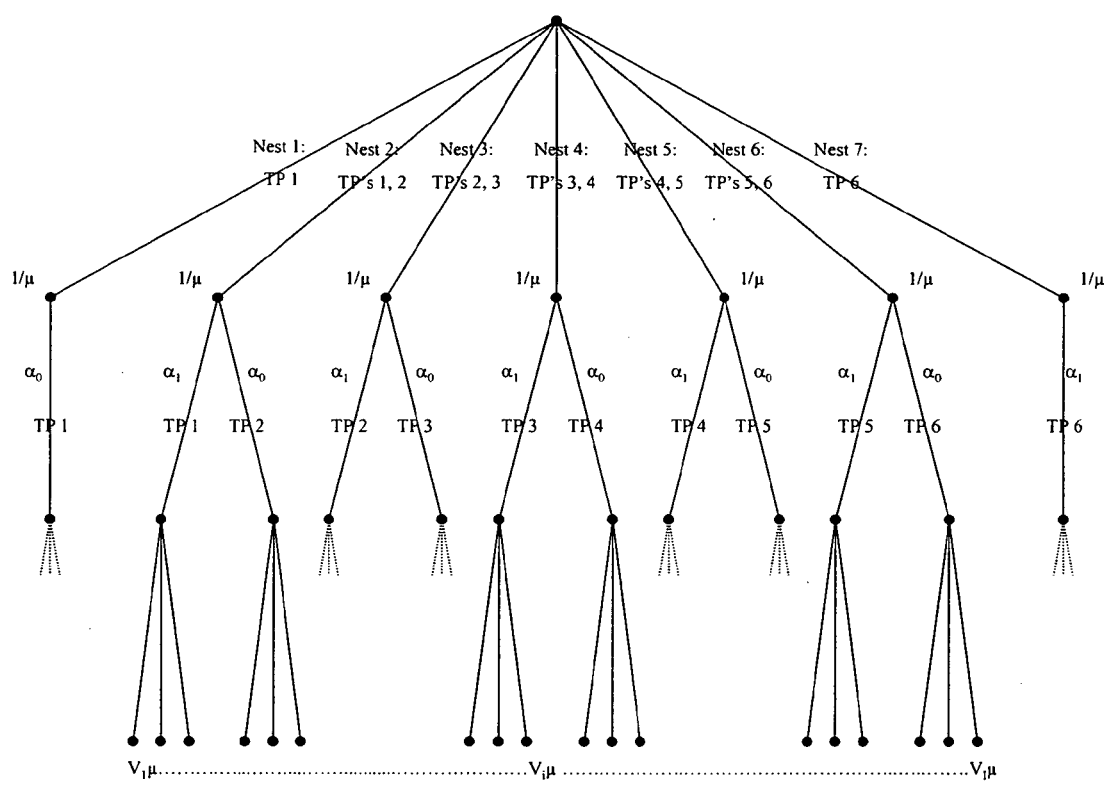
FIG. 2 illustrates a two-allocation OGEV model structure according to an exemplary implementation of certain embodiments of the present invention.

A visual representation (for a generic airport-pair-day-of-the-week) of an OGEV model with six time periods in which each itinerary is allocated to two nests is presented in FIG. 2. A visual representation of an OGEV model with eight time periods in which each itinerary is allocated to three nests is presented in FIG. 3. The share of passengers assigned to each itinerary between an airport-pair for a given day of the week is as follows:

$$S_{ick} = \sum_{j=k}^{k+M} P(i \subset k | N_j) P(N_j) \quad (2)$$

where $i \subset k$ indicates that itinerary i departs during time period k,

M+1 is the number of nests to which each itinerary is allocated, $N_j$ is nest j that includes alternative i (where j=1, 2, ..., K+M), K is the total number of time periods, $P(i \subset k | N_j)$ is the probability of choosing alternative i from nest j and $P(N_j)$ is the (unobserved) probability of choosing nest j.

Figure 3:
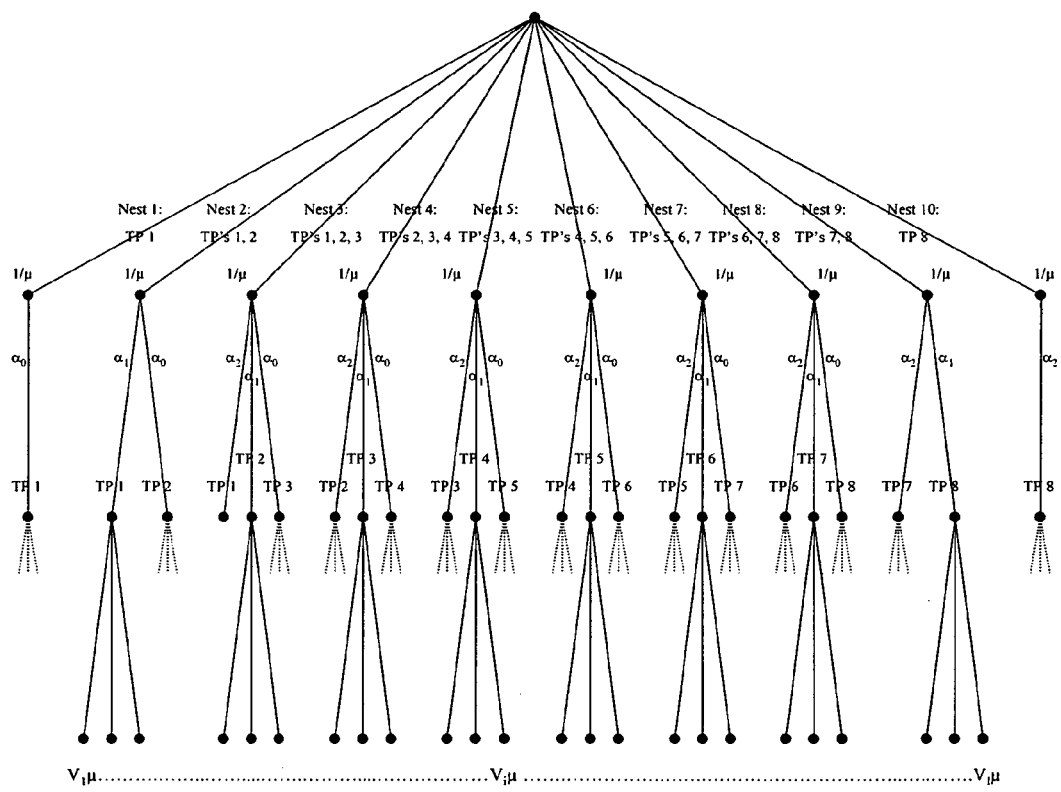
FIG. 3 illustrates a three-allocation OGEV model structure according to an exemplary implementation of certain embodiments of the present invention.

The components of equation (2) can be expanded in terms of the probability of choosing a specific itinerary, i, from nest j to which it is allocated as follows:

$$P(i \subset k | N_j) = \frac{\alpha_{j-k} \exp(\mu V_i)}{\sum_{i' \subset k' \in N_j} \alpha_{j-k'} \exp(\mu V_{i'})} \quad (2a)$$

where $\sum_{i' \subset k' \in N_j}$ is the summation over all itineraries, i', belonging to nest j, $\alpha_{j-k}$ is the allocation parameter for an itinerary belonging to time period k assigned, in part, to nests j=k, k+1, ..., k+M subject to $\alpha_i \geq 0$ and $$\sum_{i=0}^{M} \alpha_i = 1,$$

μ is the inverse logsum parameter associated with the nests and $V_{i'}$ is the deterministic portion of the utility for alternative i'.

and the probability of choosing nest j is as follows:

$$P(N_j) = \frac{\exp\left(\frac{1}{\mu} \Gamma_{N_j}\right)}{\sum_{\forall N_m} \exp\left(\frac{1}{\mu} \Gamma_{N_m}\right)} \quad (2b)$$

where $\Gamma_{N_j} = \ln\left(\sum_{i' \subset k' \in N_j} \alpha_{j-k'} \exp(\mu V_{i'})\right).$ The estimation results for the models represented in FIGS. 2 and 3 are reported in Table 3 reproduced above. The significance of the inverse logsum parameters (relative to one) and the allocation parameters (relative to both zero and one) indicate increased inter-itinerary competition for both within and proximate time periods. Both models reject the two-level NL time model (Table 2) at the 0.001 level after adjustment. Additionally, these OGEV models are behaviorally superior to the nested logit model since they allow for differential itinerary competition across time period boundaries. The statistical and behavioral superiority of these OGEV models confirms the belief that itinerary competition is differentiated by proximity in departure time (higher competition with close proximity).

The three-allocation OGEV model significantly rejects the two-allocation OGEV model at all levels of significance after adjustment. Additionally, it is behaviorally superior since (for a given itinerary) it yields four differential "levels" of inter-itinerary competition: itineraries sharing the same time period, itineraries in adjacent time periods, itineraries that are separated by two time periods and itineraries that are separated by three or more time periods (the two-allocation OGEV model allows for three differential levels of inter-itinerary competition). Examining the cross-elasticity equations of this three-allocation OGEV model for the change in the probability of itinerary j due to changes in an attribute of itinerary i illustrates these relationships. If itinerary i is three or more time periods away from itinerary j, the elasticity is given by:

$$\eta_{X_{im}}^{P_j} = \frac{\partial P_j}{\partial X_{im}} \frac{X_{im}}{P_j} = -X_{im}\beta_m P_i \qquad (3)$$

where $X_{im}$ is the value of itinerary i's $m^{th}$ attribute and $\beta_m$ is the parameter corresponding to attribute m. This is the same elasticity formula as that obtained for the MNL model. However, if itinerary j belongs to time period k and itinerary i belongs to time period (k−2) (an analogous formula applies if itinerary i belongs to time period (k+2)), the elasticity is given by:

$$\eta_{X_{im}}^{P_j} = -X_{im}\beta_m \left[ P_i + \frac{(\mu - 1)P(i|N_k)P(j|N_k)P(N_k)}{P_j} \right] \qquad (4)$$

This elasticity is larger in magnitude than the elasticity in equation (3) since μ must be larger than one. Note that the conditional probability of each itinerary given the nest (and hence the elasticity) is a function of its allocation parameter with respect to the nest (that is, $P(i|N_k)$ and $P(j|N_k)$ are functions of the underlying allocation parameters). Next, if itinerary j belongs to time period k and itinerary i belongs to time period (k−1) (an analogous formula applies if itinerary i belongs to time period (k+1)), the elasticity is given by:

$$\eta_{X_{im}}^{P_j} = -X_{im}\beta_m \times \left[ P_i + \frac{(\mu - 1)\left[ \begin{array}{l} P(j|N_k)P(i|N_k)P(N_k) + \\ P(j|N_{k+1})P(i|N_{k+1})P(N_{k+1}) \end{array} \right]}{P_j} \right] \qquad (5)$$

This elasticity is larger in magnitude than the elasticities in equations (3) and (4). Again, the magnitude of the elasticity is a function of the values of the allocation parameters. Finally, if itineraries j and i both belong to time period k, the elasticity is given by:

$$\eta_{X_{im}}^{P_j} = -X_{im}\beta_m \times \left[ P_i + \frac{(\mu - 1)\left[ \begin{array}{l} P(j|N_k)P(i|N_k)P(N_k) + \\ P(j|N_{k+1})P(i|N_{k+1})P(N_{k+1}) + \\ P(j|N_{k+2})P(i|N_{k+2})P(N_{k+2}) \end{array} \right]}{P_j} \right]. \qquad (6)$$

This elasticity is larger in magnitude than the elasticities in equations (3-5).

Examples of hybrid OGEV specifications incorporating inter-itinerary competition along the carrier and/or level-of-service dimensions, under the time dimension, are described below.

Figure 4:
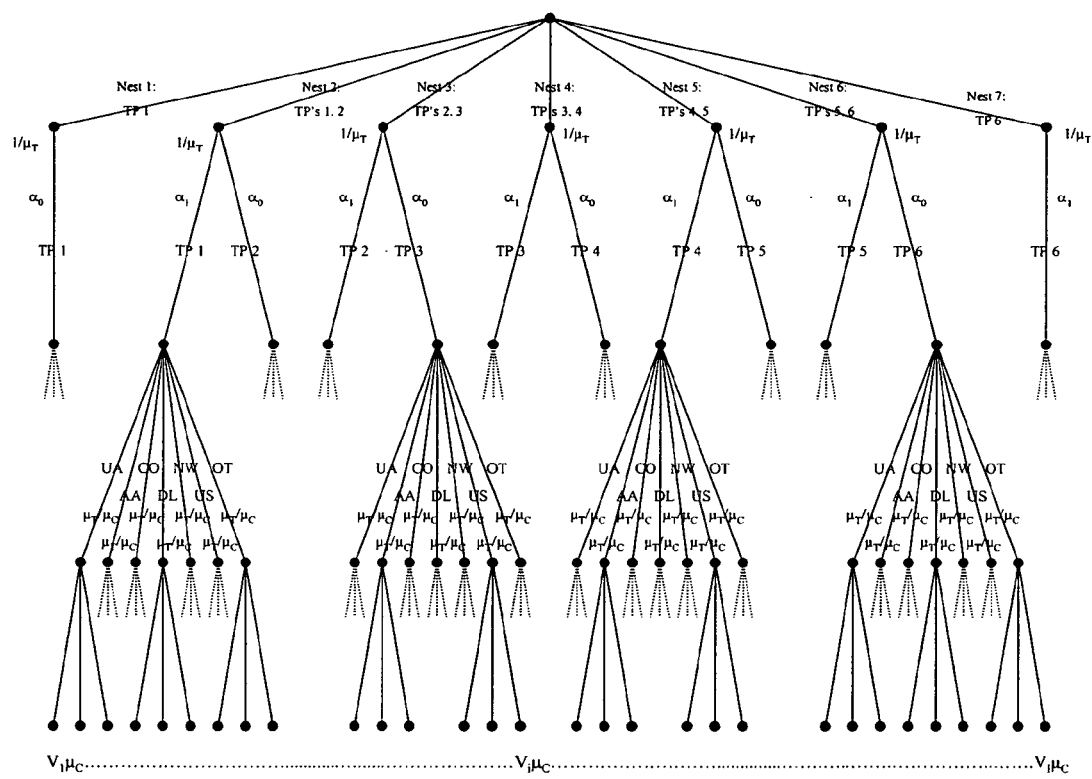
FIG. 4 illustrates a three-level time, carrier NL-OGEV (two-allocation) model structure according to an exemplary implementation of certain embodiments of the present invention.
Figure 5:
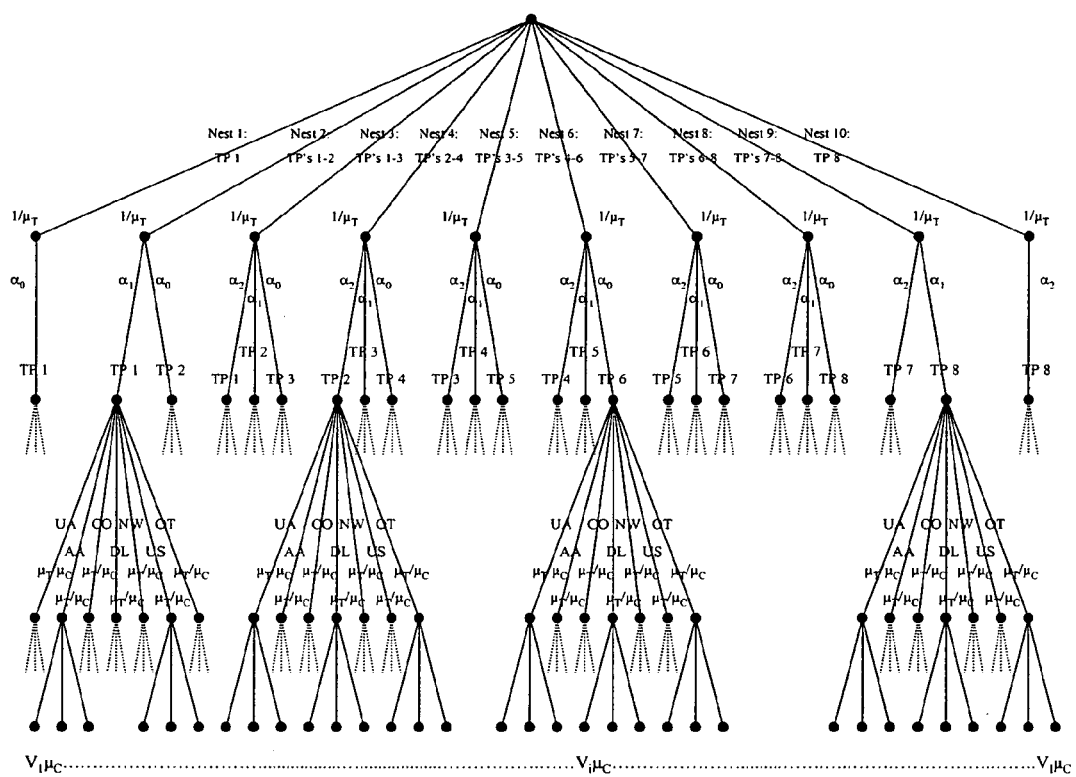
FIG. 5 illustrates a three-level time, carrier NL-OGEV (three-allocation) model structure according to an exemplary implementation of certain embodiments of the present invention.

Following the results obtained from the three-level NL models in Table 2, three-level nested logit ordered generalized extreme value (NL-OGEV) models are developed where the OGEV model structure is incorporated in the upper level of the three-level NL model structure. These models have itineraries allocated to nests at the upper level according to an OGEV structure and nested at the lower level by carrier or level-of-service. Visual representations of a three-level time, carrier NL-OGEV model (with itineraries allocated to two OGEV nests) and a three-level time, carrier NL-OGEV model (with itineraries allocated to three OGEV nests) are shown in FIGS. 4 and 5, respectively. Similar representations would show the corresponding three-level time, level-of-service NL-OGEV models.

For the three-level time, carrier NL-OGEV models, the share of passengers assigned to each itinerary between an airport-pair for a given day of the week is given by:

$$S_{ick,c} = \sum_{j=k}^{k+M} P(OGEV_j)P(c|OGEV_j)P(i|c, OGEV_j) \qquad (7)$$

$$= \sum_{j=k}^{k+M} \frac{\exp\left(\frac{1}{\mu_{OGEV}}\Gamma_j\right)}{\sum_{j' \in J} \exp\left(\frac{1}{\mu_{OGEV}}\Gamma_{j'}\right)} \times$$

$$\frac{\exp\left(\frac{\mu_{OGEV}}{\mu_{NL}}\Gamma_c\right)}{\sum_{c' \in C} \exp\left(\frac{\mu_{OGEV}}{\mu_{NL}}\Gamma_{c'}\right)} \times$$

$$\frac{\alpha_{j-k}\exp(\mu_{NL}V_i)}{\sum_{i' \subset k',c} \alpha_{j-k'}\exp(\mu_{NL}V_{i'})}$$

where $P(OGEV_j)$ is the passenger share assigned to the $j^{th}$ upper-level OGEV nest, $P(c|OGEV_j)$ is the passenger share assigned to carrier c's lower-level NL nest given the $j^{th}$ upper-level OGEV nest, $P(i|c,OGEV_j)$ is the passenger share assigned to itinerary i given lower-level carrier NL nest c and upper-level OGEV nest j, $\mu_{OGEV}$ is the inverse logsum parameter associated with the upper-level OGEV nests, $\mu_{NL}$ is the inverse logsum parameter associated with the lower-level carrier NL nests, $$\Gamma_c = \ln\left( \sum_{i' \subset k',c} \alpha_{j-k'}\exp(\mu_{NL}V_{i'}) \right) \text{ and }$$

$$\Gamma_j = \ln\left( \sum_{c' \in C} \exp\left(\frac{\mu_{OGEV}}{\mu_{NL}}\Gamma_{c'}\right) \right).$$

and similarly for three-level time, level-of-service NL-OGEV models. Consistent with the three-level NL model, the OGEV and NL inverse logsum parameter estimates must be greater than one and the lower-level NL inverse logsum parameter must be larger than the upper-level OGEV inverse logsum parameter.

The estimation results for the exemplary three-level NL-OGEV models are reported in Table 4 (the three-level time, level-of-service (three-allocation) NL-OGEV model did not yield reasonable results). The three-level time, level-of-service (two-allocation) NL-OGEV model does not reject the two-allocation OGEV model (Table 3) after adjustment. However, it does improve upon the two-allocation OGEV model before adjustment, both its inverse logsum parameters are significant after adjustment (they are significantly different from each other after adjustment as well), and the allocation parameter is significant after adjustment. These results are similar to the results presented in Table 2 where the three-level time, level-of-service NL model only marginally improves upon the two-level time NL model.

The three-level time, carrier (two-allocation) NL-OGEV model rejects the three-level time, carrier NL model (Table 2) and the two-allocation OGEV model (Table 3) at the 0.001 level (before and after adjustment).

The time, carrier (three-allocation) NL-OGEV model rejects the three-level time, carrier NL model (Table 2), the three-allocation OGEV model (Table 3) and the time, carrier (two-allocation) NL-OGEV model (Table 4) at the 0.001 level (before and after adjustment). Of the above-described models according to exemplary embodiments of the present invention, the three-level time, carrier (thee-allocation) NL-OGEV model has the best overall model statistics (by far). Additionally, its inverse logsum and allocation parameter estimates are all highly significant after adjustment. This indicates a high level of competition among itineraries flown by the same carrier within the same, adjacent or plus/minus two time periods.

These strong three-level NL-OGEV results indicate that imposing an upper-level OGEV structure and a lower-level NL structure on the itinerary competition dynamic dramatically improves upon the more rigid NL model structure. In addition to reinforcing the finding from Table 2 that the within carrier and (to a lesser extent) within level-of-service competition dynamic should be conditioned by time period, the significance of the OGEV allocation parameters in these models indicate that itineraries do indeed have several differential levels of competition (with respect to departure time) with other itineraries. That is, the closer itineraries are to each other (with respect to departure time) the more they will compete with each other.

A three-level weighted nested logit OGEV model according to an exemplary embodiment of the present invention is estimated as described below. This model combines results of the three-level NL-OGEV models.

The three-level weighted nested logit ordered generalized extreme value (WNL-OGEV) model combines the OGEV model with the three-level WNL model. This allows for the simultaneous estimation of parallel NL-OGEV structures with a weight parameter indicating the relative importance of each structure.

Figure 6:
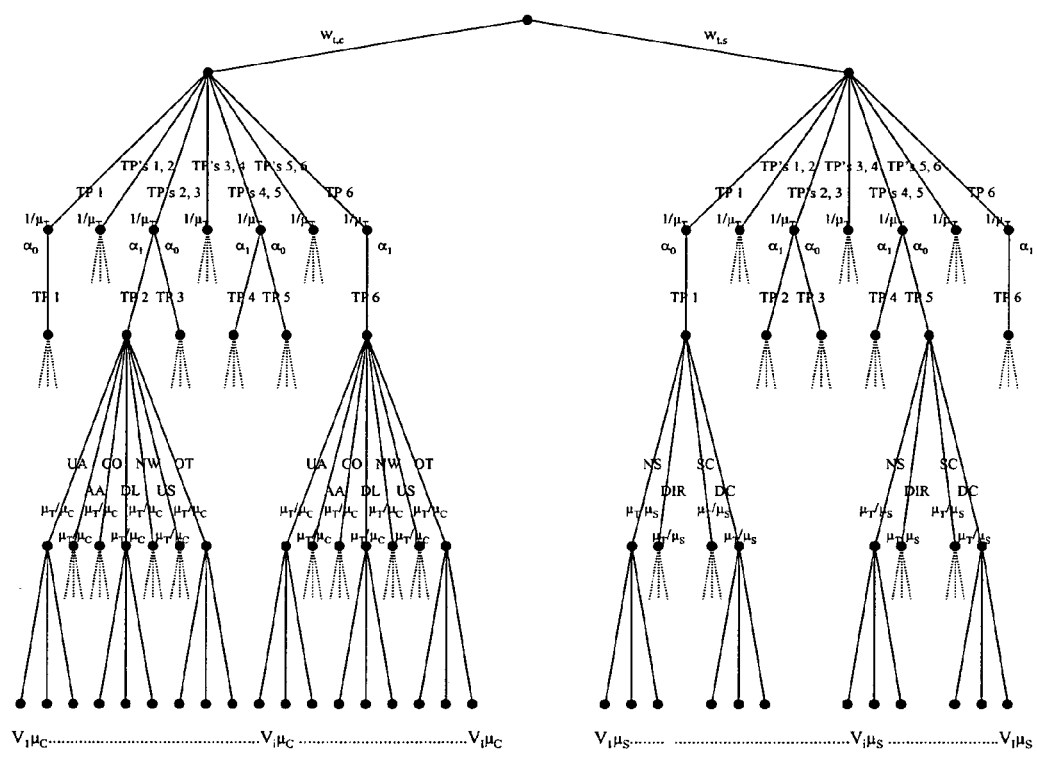
FIG. 6 illustrates a three-level time I carrier, time|level-of-service WNL-OGEV (two-allocation) model structure according to an exemplary implementation of certain embodiments of the present invention.

Due to the marginal significance of the three-level time, level-of-service (two-allocation) NL-OGEV model and the significance of the three-level time, carrier (two-allocation) NL-OGEV model, a three-level WNL-OGEV (two-allocation) model is estimated with parallel three-level NL-OGEV structures for time, carrier and time, level-of-service. That is, within each structure itineraries are nested at the upper level according to an OGEV specification and are nested at the lower level by level-of-service or carrier. FIG. 6 gives a visual representation of this model and its mathematical structure is given by:

$$S_{i \subset k,c,l} = w_{t,c} \sum_{j=k}^{k+M} P(OGEV_j)P(c \mid OGEV_j)P(i \mid c, OGEV_j) + \quad (8)$$

$$w_{t,l} \sum_{j=k}^{k+M} P(OGEV_j)P(l \mid OGEV_j)P(i \mid l, OGEV_j)$$

where $w_{t,c}$ is the weight given to the time|carrier structure,
$w_{t,l}=1-w_{t,c}$ is the weight given to the time|level-of-service structure,
the first summation is identical to equation (7) and
the second summation is identical to equation (7) except for the substitution of level of service, l, for carrier, c.

The estimation results for this model are reported in Table 4. The upper-level OGEV inverse logsum parameter is significant at the 0.001 level after adjustment and the lower-level NL inverse logsum parameter for carrier is significant (at the 0.001 level) after adjustment indicating a high level of competition among itineraries flown by a carrier within the same or adjacent time periods. However, the lower-level inverse logsum parameter for level-of-service is only significant at the 0.10 level after adjustment. Additionally, after adjustment, the weight on the time, carrier structure is only significantly different from one at the 0.10 level. Similar to the results presented in Table 2 (with respect to the three-level WNL model), these results indicate that the time, carrier side of the model "dominates". Finally, after adjustment, the model is only marginally better than the three-level time, carrier (two-allocation) NL-OGEV model.

As described above, certain exemplary embodiments of the present invention propose and estimate advanced GEV models to account for the underlying competitive dynamic among air-travel itineraries. Models are estimated capturing realistic inter-itinerary competition dynamics along the time of day dimension. Each of the models tests the hypothesis that air-travel itineraries (for a given airport-pair-day-of-the-week) exhibit proximate covariance; that is, the amount of competition (substitution) between itineraries increases as the difference in their departure times decreases. Variations of the nested logit model are not capable of capturing this phenomenon.

Two and three-allocation exemplary OGEV models are estimated. Both of these models show that air-travel itineraries do indeed exhibit the proximate covariance property. Thus, the hypothesis that nested logit models (with itineraries nested by departure time) are adequate to describe the inter-itinerary competition dynamic along the time of day dimension is rejected. The three-allocation OGEV model captures, for each itinerary, four differential levels of competition with respect to other itineraries in its airport-pair along the time of day dimension (depending on the proximity of the itineraries' departure times). According to exemplary embodiments of the present invention, these OGEV models successfully capture the proximate covariance property.

Advanced hybrid OGEV models according to exemplary embodiments of the present invention are estimated incorporating an OGEV structure at the upper level with a GEV (in particular, NL and WNL) structure on the lower level. In addition to capturing the proximate covariance property of air-travel itineraries, these models also measure differential inter-itinerary competition dynamics along the carrier and/or level-of-service dimensions. Of these models, the three-level time, carrier (three-allocation) NL-OGEV model yielded superior model statistics and behavioral interpretations.

The models estimated according to exemplary embodiments of the present invention are shown to have advantages over the more restrictive model structures previously estimated by the inventors (see Reference 42), leading to a clearer understanding of the air-travel itinerary competition dynamic. These models group and order alternatives (itineraries, flights, and so forth) along the time-of-day dimension.

According to exemplary implementations of the present invention, OGEV and hybrid-OGEV models are applicable to any type of aviation demand modeling/forecasting application with respect to alternative (that is, itineraries, flights, routes, and so forth) competition, substitution, and/or correlation along the time-of-day dimension. As noted above, other types of transportation modes would be applicable as well (bus, train, ship, and so forth). Also, time-of-day may not be the only applicable "competition" dimension. For example, fare-classes may be an alternative, or another, competition dimension.

Exemplary embodiments of the present invention can also comprise computer readable codes on a computer readable medium. The computer readable medium can comprise any data storage device that can store data that can be read by a computer system. Examples of a computer readable medium include magnetic storage media (such as, ROM, floppy disks, hard disks, among others), optical recording media (such as, CD-ROMs, or DVDs), and storage mechanisms such as carrier waves (such as, transmission through the Internet). The computer readable medium can also be distributed over network coupled computer systems so that the computer readable code is stored and executed in a distributed fashion. Also, functional programs, codes, and code segments for accomplishing exemplary embodiments of the present invention can be construed by programmers of ordinary skill in the art to which the present invention pertains.

While the present invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method of modeling choice behavior in a computer system, the method comprising:
   selecting a choice scenario for modeling, the choice scenario comprising a fixed plurality of alternatives;
   obtaining a sample of representative decision-makers capable of choosing at least one of the alternatives, the decision-makers comprising at least one consumer of a product or service associated with the at least one of the alternatives;
   defining at least one of first attributes associated with the alternatives;
   identifying actual alternatives selected by the representative decision-makers;
   selecting a computer implemented parameterized discrete choice model structure;
   estimating model parameters for the selected parameterized discrete choice model structure;
   determining a proximate covariance property of the alternatives based on the first attributes; and
   determining by a computer, using the selected computer implemented parameterized discrete choice model structure with the estimated model parameters, a probability that a decision-maker presented with a choice of alternatives that compete as a function of proximity of the alternatives along an attribute dimension and are associated with the choice scenario will choose at least one of the alternatives,
   wherein the selecting of the computer implemented parameterized discrete choice model structure comprises assigning a share of consumers to each choice alternative using one of:
   a three-level Nested Logit Ordered Generalized Extreme Value (NL-OGEV) model using a first equation:

$$S_{i \subset k, c} = \sum_{j=k}^{k+M} P(OGEV_j) P(c|OGEV_j) P(i|OGEV_j) = \sum_{j=k}^{k+M} \frac{\exp\left(\frac{1}{\mu_{OGEV}} \Gamma_j\right)}{\sum_{j' \in J} \exp\left(\frac{1}{\mu_{OGEV}} \Gamma_{j'}\right)} \times \frac{\exp\left(\frac{\mu_{OGEV}}{\mu_{NL}} \Gamma_c\right)}{\sum_{c' \in C} \exp\left(\frac{\mu_{OGEV}}{\mu_{NL}} \Gamma_{c'}\right)} \times \frac{\alpha_{j-k} \exp(\mu_{NL} V_i)}{\sum_{i' \subset k', c} \alpha_{j-k'} \exp(\mu_{NL} V_{i'})}$$

where i is a choice alternative,
$V_i$ is a value of an alternative,
k, c and j are index variables,
K is a number of values within a first attribute dimension (k=1, 2, ..., K),
C is a number of values within a second attribute dimension (c=1, 2, ..., C),
M+1 is a number of upper-level OGEV nests to which each alternative is allocated,
J is a number of upper-level OGEV nests (J=K+M and j=k, 2, ..., K+M),
$S_{i \subset k, c}$ is a share of consumers assigned to alternative i described by k and c, $$\sum_{j' \in J}$$

is a summation over upper-level OGEV nests, j', within J, $$\sum_{c' \in C}$$

is a summation over values of the second attribute dimension, c', within C, $$\sum_{i' \subset k', c}$$

is a summation over alternatives, i', where the value of the first attribute dimension belongs to value range k', and the value of the second attribute dimension is c,
$\alpha_{j-k}$: is an allocation parameter for an alternative belonging to value range k assigned, in part, to nests j= k,k+1, ..., k+M subject to $\alpha_i \geq 0$ and $$\sum_{i=0}^{M} \alpha_i = 1,$$

$P(OGEV_j)$ is a consumer share assigned to the $j^{th}$ upper-level OGEV nest,
$P(c|OGEV_j)$ is a consumer share assigned to c's lower-level NL nest given the $j^{th}$ upper-level OGEV nest,
$P(i|c, OGEV_j)$ is a consumer share assigned to choice alternative i given lower-level NL nest c and upper-level OGEV nest j, $\mu_{OGEV}$ is an inverse logsum parameter associated with the upper-level OGEV nests, $\mu_{NL}$ is an inverse logsum parameter associated with the lower-level NL nests, $$\Gamma_c = \ln\left(\sum_{i' \subset k', c} \alpha_{j-k'} \exp(\mu_{NL} V_{i'})\right), \text{ and}$$

$$\Gamma_j = \ln\left(\sum_{c' \in C} \exp\left(\frac{\mu_{OGEV}}{\mu_{NL}} \Gamma_{c'}\right)\right);$$

or a three-level Weighted Nested Logit Ordered Generalized Extreme Value (WNL-OGEV) model using a second equation:

$$S_{i \subset k, c, l} = w_{t,c} \sum_{j=k}^{k+M} P(OGEV_j) P(c|OGEV_j) P(i|lOGEV_j) +$$

$$w_{t,l} \sum_{j=k}^{k+M} P(OGEV_j) P(l|OGEV_j) P(i|l, OGEV_j)$$

where l is an index variable;

L is a number of values within a third attribute dimension (l=1, 2, ..., L);

$w_c$ is a weight (between 0 and 1) given to one three-level NL-OGEV structure, and $w_l = 1 - w_c$ is a weight given to a parallel three-level NL-OGEV structure.

2. The method of claim 1, wherein the choice scenario comprises at least one of a service and a product having at least two selectable alternatives.

3. The method according to claim 1, wherein the choice scenario comprises at least one of travel itinerary selection, residential location selection, item ownership or purchase selection and financial product selection.

4. The method of claim 1, wherein the at least one of the first attributes comprises at least one of time-dependent attribute, location-dependent attribute and value-dependent attribute.

5. The method of claim 1, further comprising defining at least one of second attributes associated with at least one of the decision-makers.

6. The method of claim 5, wherein the at least one of the second attributes comprises at least one of age-dependent attribute, gender-dependent attribute, socio-economic -dependent attribute, marital-status-dependent attribute, profession-dependent attribute and education-dependent attribute.

7. The method of claim 1, wherein the identifying of the actual alternatives comprises at least one of:

evaluating historical data to obtain the actual alternatives based on revealed preference (RP) data; and conducting a survey of the sample of the decision-makers to obtain the actual alternatives based on stated preference (SP) data.

8. The method of claim 1, wherein the selecting of the parameterized discrete choice model structure comprises assessing interaction among the alternatives.

9. The method of claim 1, wherein the estimating of the model parameters comprising using maximum likelihood techniques to evaluate the actual alternatives.

10. The method of claim 1, wherein:

the obtaining of the sample of representative decision-makers comprises obtaining a sample of representative consumers capable of choosing a set of the alternatives;

the defining of the at least one of the first attributes comprises defining a set of the first attributes associated with the set of the alternatives; and the determining of the probability comprises determining probabilities that a consumer presented with the choice of the alternatives will choose any alternatives associated with the set of the first attributes.

11. The method of claim 10, further comprising determining at least one interrelationship between the alternatives of the set of alternatives.

12. The method of claim 11, wherein the determining of the at least one interrelationship is based on the first attributes of the alternatives.

13. The method of claim 11, further comprising assessing an effect of altering of at least one of the alternatives on at least one other of the alternatives.

14. The method of claim 13, wherein the effect comprises a market share associated with the at least one other of the alternatives.

15. The method of claim 5, wherein the estimating of the model parameters comprises using maximum likelihood techniques to evaluate at least one of the first attributes and the second attributes.

16. A system for modeling consumer choice behavior, the system comprising:

an input for facilitating selection of a choice scenario for modeling, the choice scenario comprising a fixed plurality of alternatives, wherein at least one of first attributes is associated with the alternatives;

a selector for selecting a parameterized discrete choice model structure; and a processor for estimating, using actual alternatives selected by a sample of representative decision-makers capable of choosing at least one of the alternatives, model parameters for the selected parameterized discrete choice model structure, determining, using the selected parameterized discrete choice model structure with the estimated model parameters, a probability that a decision-maker presented with a choice of alternatives that compete as a function of proximity of the alternatives along an attribute dimension and are associated with the choice scenario will choose the at least one of the alternatives, and determining a proximate covariance property of the alternatives based on the first attributes, wherein the decision-makers comprise at least one consumer of a product or service associated with the at least one of the alternatives, and the selecting of the parameterized discrete choice model structure comprises assigning a share of consumers to each choice alternative using one of:

a three-level Nested Logit Ordered Generalized Extreme Value (NL-OGEV) model using a third equation:

$$S_{i \subset k, c} =$$

$$\sum_{j=k}^{k+M} P(OGEV_j) P(c|OGEV_j) P(i|OGEV_j) = \sum_{j=k}^{k+M} \frac{\exp\left(\frac{1}{\mu_{OGEV}} \Gamma_j\right)}{\sum_{j' \in J} \exp\left(\frac{1}{\mu_{OGEV}} \Gamma_{j'}\right)} \times$$

$$\frac{\exp\left(\frac{\mu_{OGEV}}{\mu_{NL}} \Gamma_c\right)}{\sum_{c' \in C} \exp\left(\frac{\mu_{OGEV}}{\mu_{NL}} \Gamma_{c'}\right)} \times \frac{\alpha_{j-k} \exp(\mu_{NL} V_i)}{\sum_{i' \subset k', c} \alpha_{j-k'} \exp(\mu_{NL} V_{i'})}$$

where i is a choice alternative,
  $V_i$ is a value of an alternative,
  k, c and j are index variables,
  K is a number of values within a first attribute dimension (k=1, 2, ..., K),
  C is a number of values within a second attribute dimension (c=1, 2, ..., C),
  M+1 is a number of upper-level OGEV nests to which each alternative is allocated,
  J is a number of upper-level OGEV nests (J=K+M and j=k, 2, ..., K+M),
  $S_{i \subset k, c}$ is a share of consumers assigned to alternative i described by k and c, $$\sum_{j' \in J}$$

is a summation over upper-level OGEV nests, j', within J, $$\sum_{c' \in C}$$

is a summation over values of the second attribute dimension, c', within C, $$\sum_{i' \subset k', c}$$

is a summation over alternatives, i', where the value of the first attribute dimension belongs to value range k', and the value of the second attribute dimension is c,
  $\alpha_{j-k}$: is an allocation parameter for an alternative belonging to value range k assigned, in part, to nests j=k, k+1, ..., k+M subject to $\alpha_i \geq 0$ and $$\sum_{i=0}^{M} \alpha_i = 1,$$

$P(OGEV_j)$ is a consumer share assigned to the $j^{th}$ upper-level OGEV nest,
  $P(c|OGEV_j)$ is a consumer share assigned to c's lower-level NL nest given the $j^{th}$ upper-level OGEV nest,
  $P(i|c, OGEV_j)$ is a consumer share assigned to choice alternative i given lower-level NL nest c and upper-level OGEV nest j, $\mu_{OGEV}$ is an inverse logsum parameter associated with the upper-level OGEV nests,
  $\mu_{NL}$ is an inverse logsum parameter associated with the lower-level NL nests, $$\Gamma_c = \ln\left(\sum_{i' \subset k', c} \alpha_{j-k'} \exp(\mu_{NL} V_{i'})\right), \text{ and}$$

$$\Gamma_j = \ln\left(\sum_{c' \in C} \exp\left(\frac{\mu_{OGEV}}{\mu_{NL}} \Gamma_{c'}\right)\right);$$

or
a three-level Weighted Nested Logit Ordered Generalized Extreme Value (WNL-OGEV) model using a fourth equation:

$$S_{i \subset k, c, l} = w_{t, c} \sum_{j=k}^{k+M} P(OGEV_j) P(c|OGEV_j) P(i|OGEV_j) +$$

$$w_{t, l} \sum_{j=k}^{k+M} P(OGEV_j) P(l|OGEV_j) P(i|l, OGEV_j)$$

where l is an index variable;
  L is a number of values within a third attribute dimension (l=1, 2, ..., L);
  $w_c$ is a weight (between 0 and 1) given to one three-level NL-OGEV structure, and
  $w_l = 1 - w_c$ is a weight given to a parallel three-level NL-OGEV structure.

17. The system of claim 16, wherein at least one of second attributes is associated with at least one of the decision-makers.

18. The system of claim 17, wherein the processor estimates the model parameters using maximum likelihood techniques to evaluate at least one of the first attributes and the second attributes.

19. The system of claim 17, wherein the sample of representative decision-makers comprises a sample of representative consumers capable of choosing a set of the alternatives, and the processor defines a set of the first attributes associated with the set of the alternatives and determines probabilities that a consumer presented with the choice of the alternatives will choose any alternatives associated with the set of the first attributes.

20. The system of claim 19, wherein the processor determines at least one interrelationship between the alternatives of the set of alternatives.

21. The system of claim 20, wherein the processor determines the at least one interrelationship based on the first attributes of the alternatives.

22. The system of claim 20, wherein the processor assesses an effect of altering of at least one of the alternatives on at least one other of the alternatives.

23. The system of claim 22, wherein the effect comprises a market share associated with the at least one other of the alternatives.

24. A non-transitory computer-readable medium having recorded thereon computer-executable instructions comprising:
  a first code segment, for facilitating selection of a choice scenario for modeling, the choice scenario comprising a fixed plurality of alternatives, wherein at least one of first attributes is associated with the alternatives;

a second code segment, for selecting a parameterized discrete choice model structure;

a third code segment, for estimating, using actual alternatives selected by a sample of representative decision-makers capable of choosing at least one of the alternatives, model parameters for the selected parameterized discrete choice model structure, and for determining, using the selected parameterized discrete choice model structure with the estimated model parameters, a probability that a decision-maker presented with a choice of alternatives that compete as a function of proximity of the alternatives along an attribute dimension and are associated with the choice scenario will choose the at least one of the alternatives; and a fourth code segment, for determining a proximate covariance property of the alternatives based on the first attributes, wherein the decision-makers comprise at least one consumer of a product or service associated with the at least one of the alternatives, and the selecting of the parameterized discrete choice model structure comprises assigning a share of consumers to each choice alternative using one of:

a three-level Nested Logit Ordered Generalized Extreme Value (NL-OGEV) model using a fifth equation:

$$S_{i \subset k,c} = \sum_{j=k}^{k+M} P(OGEV_j)P(c|OGEV_j)P(i|OGEV_j) = \sum_{j=k}^{k+M} \frac{\exp\left(\frac{1}{\mu_{OGEV}}\Gamma_j\right)}{\sum_{j' \in J}\exp\left(\frac{1}{\mu_{OGEV}}\Gamma_{j'}\right)} \times \frac{\exp\left(\frac{\mu_{OGEV}}{\mu_{NL}}\Gamma_c\right)}{\sum_{c' \in C}\exp\left(\frac{\mu_{OGEV}}{\mu_{NL}}\Gamma_{c'}\right)} \times \frac{\alpha_{j-k}\exp(\mu_{NL}V_i)}{\sum_{i' \subset k',c}\alpha_{j-k'}\exp(\mu_{NL}V_{i'})}$$

where i is a choice alternative, $V_i$ is a value of an alternative, k, c and j are index variables, K is a number of values within a first attribute dimension (k=1, 2, ..., K), C is a number of values within a second attribute dimension (c=1, 2, ..., C), M+1 is a number of upper-level OGEV nests to which each alternative is allocated, J is a number of upper-level OGEV nests (J=K+M and j=k, 2, ..., K+M), $S_{i \subset k,c}$ is a share of consumers assigned to alternative i described by k and c, $$\sum_{j' \in J}$$

is a summation over upper-level OGEV nests, j', within J, $$\sum_{c' \in C}$$

is a summation over values of the second attribute dimension, c', within C, $$\sum_{i' \subset k',c}$$

is a summation over alternatives, i', where the value of the first attribute dimension belongs to value range k', and the value of the second attribute dimension is c, $\alpha_{j-k}$ : is an allocation parameter for an alternative belonging to value range k assigned, in part, to nests j=k,k+1, ..., k+M subject to $\alpha_i \geq 0$ and $$\sum_{i=0}^{M}\alpha_i = 1,$$

$P(OGEV_j)$ is a consumer share assigned to the $j^{th}$ upper-level OGEV nest, $P(c|OGEV_j)$ is a consumer share assigned to c's lower-level NL nest given the $j^{th}$ upper-level OGEV nest, $P(i|c,OGEV_j)$ is a consumer share assigned to choice alternative i given lower-level NL nest c and upper-level OGEV nest j, $\mu_{OGEV}$ is an inverse logsum parameter associated with the upper-level OGEV nests, $\mu_{NL}$ is an inverse logsum parameter associated with the lower-level NL nests, $$\Gamma_c = \ln\left(\sum_{i' \subset k',c}\alpha_{j-k'}\exp(\mu_{NL}V_{i'})\right), \text{ and}$$

$$\Gamma_j = \ln\left(\sum_{c' \in C}\exp\left(\frac{\mu_{OGEV}}{\mu_{NL}}\Gamma_{c'}\right)\right);$$

or a three-level Weighted Nested Logit Ordered Generalized Extreme Value (WNL-OGEV) model using a sixth equation:

$$S_{i \subset k,c,l} = w_{t,c}\sum_{j=k}^{k+M} P(OGEV_j)P(c|OGEV_j)P(i|OGEV_j) + w_{t,l}\sum_{j=k}^{k+M} P(OGEV_j)P(l|OGEV_j)P(i|l, OGEV_j)$$

where l is an index variable;

L is a number of values within a third attribute dimension (l=1, 2, ..., L);

$w_c$ is a weight (between 0 and 1) given to one three-level NL-OGEV structure, and $w_l=1-w_c$ is a weight given to a parallel three-level NL-OGEV structure.

25. The computer-readable medium of claim 24, wherein at least one of second attributes is associated with at least one of the decision-makers.

26. The computer-readable medium of claim 25, further comprising a fifth code segment, for estimating the model parameters using maximum likelihood techniques to evaluate at least one of the first attributes and the second attributes.

27. The computer-readable medium of claim 25, wherein the sample of representative decision-makers comprises a sample of representative consumers capable of choosing a set of the alternatives, and the computer-readable medium further comprises:
- a sixth code segment, for defining a set of the first attributes associated with the set of the alternatives; and
- a seventh code segment, for determining probabilities that a consumer presented with the choice of the alternatives will choose any alternatives associated with the set of the first attributes.

28. The computer-readable medium of claim 27, further comprising an eighth code segment, for determining at least one interrelationship between the alternatives of the set or alternatives.

29. The computer-readable medium of claim 28, wherein the at least one interrelationship is determined based on the first attributes of the alternatives.

30. The computer-readable recording medium claim 28, further comprising a ninth code segment, for assessing an effect of altering of at least one of the alternatives on at least one other of the alternatives.

31. The computer-readable recording medium claim 30, wherein the effect comprises a market share associated with the at least one other of the alternatives.

32. The method of claim 1, wherein the selecting of the computer implemented parameterized discrete choice model structure comprises assigning, for the three-level Nested Logit Ordered Generalized Extreme Value (NL-OGEV) models, a share of passengers to each itinerary between an airport-pair for a given day of a week using the first equation:

$$S_{i \subset k,c} = \sum_{j=k}^{k+M} P(OGEV_j) P(c|OGEV_j) P(i|OGEV_j) = \sum_{j=k}^{k+M} \frac{\exp\left(\frac{1}{\mu_{OGEV}} \Gamma_j\right)}{\sum_{j' \in J} \exp\left(\frac{1}{\mu_{OGEV}} \Gamma_{j'}\right)} \times \frac{\exp\left(\frac{\mu_{OGEV}}{\mu_{NL}} \Gamma_c\right)}{\sum_{c' \in C} \exp\left(\frac{\mu_{OGEV}}{\mu_{NL}} \Gamma_{c'}\right)} \times \frac{\alpha_{j-k} \exp(\mu_{NL} V_i)}{\sum_{i' \subset k',c} \alpha_{j-k'} \exp(\mu_{NL} V_{i'})}$$

where $P(OGEV_j)$ is a passenger share assigned to the $j^{th}$ upper-level OGEV nest,
$P(c|OGEV_j)$ is a passenger share assigned to a carrier c's lower-level NL nest given the $j^{th}$ upper-level OGEV nest,
$P(i|c,OGEV_j)$ is a passenger share assigned to itinerary i given lower-level carrier NL nest c and upper-level OGEV nest j,
$\mu_{OGEVj}$ is an inverse logsum parameter associated with the upper-level OGEV nests,
$\mu_{NL}$ is an inverse logsum parameter associated with the lower-level carrier NL nests,
c is a carrier, $$\Gamma_c = \ln\left(\sum_{i' \subset k',c} \alpha_{j-k'} \exp(\mu_{NL} V_{i'})\right) \text{ and}$$

-continued $$\Gamma_j = \ln\left(\sum_{c' \in C} \exp\left(\frac{\mu_{OGEV}}{\mu_{NL}} \Gamma_{c'}\right)\right).$$

33. The method of claim 1, wherein the assigning comprising using a three-level Weighted Nested Logit Ordered Generalized Extreme Value (WNL-OGEV) Model using the second equation:

$$S_{i \subset k,c,l} = w_{t,c} \sum_{j=k}^{k+M} P(OGEV_j) P(c|OGEV_j) P(i|OGEV_j) + w_{t,l} \sum_{j=k}^{k+M} P(OGEV_j) P(l|OGEV_j) P(i|l, OGEV_j)$$

where $w_{t,c}$ is a weight given to a time|carrier structure,
$w_{t,l} = 1 - w_{t,c}$ is a weight given to that time|level-of-service structure,
t is time,
c is a carrier, and
l is a level of service.

34. The method of claim 16, wherein the selecting of the parameterized discrete choice model structure comprises assigning, for the three-level Nested Logit Ordered Generalized Extreme Value (NL-OGEV) models, a share of passengers to each itinerary between an airport-pair for a given day of a week using the third equation:

$$S_{i \subset k,c} =$$

$$\sum_{j=k}^{k+M} P(OGEV_j) P(c|OGEV_j) P(i|OGEV_j) = \sum_{j=k}^{k+M} \frac{\exp\left(\frac{1}{\mu_{OGEV}} \Gamma_j\right)}{\sum_{j' \in J} \exp\left(\frac{1}{\mu_{OGEV}} \Gamma_{j'}\right)} \times \frac{\exp\left(\frac{\mu_{OGEV}}{\mu_{NL}} \Gamma_c\right)}{\sum_{c' \in C} \exp\left(\frac{\mu_{OGEV}}{\mu_{NL}} \Gamma_{c'}\right)} \times \frac{\alpha_{j-k} \exp(\mu_{NL} V_i)}{\sum_{i' \subset k',c} \alpha_{j-k'} \exp(\mu_{NL} V_{i'})}$$

where $P(OGEV_j)$ is a passenger share assigned to the $j^{th}$ upper-level OGEV nest,
$P(c|OGEV_j)$ is a passenger share assigned to a carrier c's lower-level NL nest given the $j^{th}$ upper-level OGEV nest,
$P(i|c,OGEV_j)$ is a passenger share assigned to itinerary i given lower-level carrier NL nest c and upper-level OGEV nest j,
$\mu_{OGEV}$ is an inverse logsum parameter associated with the upper-level OGEV nests,
$\mu_{NL}$ is an inverse logsum parameter associated with the lower-level carrier NL nests,
c is a carrier, $$\Gamma_c = \ln\left(\sum_{i' \subset k',c} \alpha_{j-k'} \exp(\mu_{NL} V_{i'})\right) \text{ and}$$

$$\Gamma_j = \ln\left(\sum_{c' \in C} \exp\left(\frac{\mu_{OGEV}}{\mu_{NL}} \Gamma_{c'}\right)\right).$$

35. The method of claim 16, wherein the assigning comprising using a three-level Weighted Nested Logit Ordered Generalized Extreme Value (WNL-OGEV) Model using the fourth equation:

$$S_{i \subset k,c,l} = w_{t,c} \sum_{j=k}^{k+M} P(OGEV_j)P(c|OGEV_j)P(i|OGEV_j) +$$

$$w_{t,l} \sum_{j=k}^{k+M} P(OGEV_j)P(l|OGEV_j)P(i|l, OGEV_j)$$

where $w_{t,c}$ is a weight given to a time|carrier structure,
$w_{t,l} = 1 - w_{t,c}$ is a weight given to that time|level-of-service structure,
t is time,
c is a carrier, and
l is a level of service.

36. The method of claim 24, wherein the selecting of the parameterized discrete choice model structure comprises assigning, for the three-level Nested Logit Ordered Generalized Extreme Value (NL-OGEV) models, a share of passengers to each itinerary between an airport-pair for a given day of a week using the fifth equation:

$$S_{i \subset k, c} =$$

$$\sum_{j=k}^{k+M} P(OGEV_j)P(c|OGEV_j)P(i|OGEV_j) = \sum_{j=k}^{k+M} \frac{\exp\left(\frac{1}{\mu_{OGEV}}\Gamma_j\right)}{\sum_{j' \in J} \exp\left(\frac{1}{\mu_{OGEV}}\Gamma_{j'}\right)} \times$$

$$\frac{\exp\left(\frac{\mu_{OGEV}}{\mu_{NL}}\Gamma_c\right)}{\sum_{c' \in C} \exp\left(\frac{\mu_{OGEV}}{\mu_{NL}}\Gamma_{c'}\right)} \times \frac{\alpha_{j-k}\exp(\mu_{NL}V_i)}{\sum_{i' \subset k',c} \alpha_{j-k'}\exp(\mu_{NL}V_{i'})}$$

where $P(OGEV_j)$ is a passenger share assigned to the $j^{th}$ upper-level OGEV nest, $P(c|OGEV_j)$ is a passenger share assigned to a carrier c's lower-level NL nest given the $j^{th}$ upper-level OGEV nest, $P(i|c, OGEV_j)$ is a passenger share assigned to itinerary i given lower-level carrier NL nest c and upper-level OGEV nest j, $\mu_{OGEV}$ is an inverse logsum parameter associated with the upper-level OGEV nests, $\mu_{NL}$ is an inverse logsum parameter associated with the lower-level carrier NL nests, c is a carrier, $$\Gamma_c = \ln\left(\sum_{i' \subset k',c} \alpha_{j-k'} \exp(\mu_{NL}V_{i'})\right) \text{ and}$$

$$\Gamma_j = \ln\left(\sum_{c' \in C} \exp\left(\frac{\mu_{OGEV}}{\mu_{NL}}\Gamma_{c'}\right)\right).$$

37. The method of claim 24, wherein the assigning comprising using a three-level Weighted Nested Logit Ordered Generalized Extreme Value (WNL-OGEV) Model using the sixth equation:

$$S_{i \subset k,c,l} = w_{t,c} \sum_{j=k}^{k+M} P(OGEV_j)P(c|OGEV_j)P(i|OGEV_j) +$$

$$w_{t,l} \sum_{j=k}^{k+M} P(OGEV_j)P(l|OGEV_j)P(i|l, OGEV_j)$$

where $w_{t,c}$ is a weight given to a time|carrier structure,
$w_{t,l} = 1 - w_{t,c}$ is a weight given to that time|level-of-service structure,
t is time,
c is a carrier, and
l is a level of service.

\* \* \* \* \*